(12) United States Patent
Tower et al.

(10) Patent No.: US 7,393,381 B2
(45) Date of Patent: **\*Jul. 1, 2008**

(54) REMOVING SILOXANES FROM A GAS STREAM USING A MINERAL BASED ADSORPTION MEDIA

(75) Inventors: Paul M. Tower, Snohomish, WA (US); Jeffrey V. Wetzel, Lake Stevens, WA (US)

(73) Assignee: Applied Filter Technology, Inc., Snohomish, WA (US)

( * ) Notice: Subject to any disclaimer, the term of this patent is extended or adjusted under 35 U.S.C. 154(b) by 535 days.

This patent is subject to a terminal disclaimer.

(21) Appl. No.: 11/079,459

(22) Filed: Mar. 8, 2005

(65) Prior Publication Data

US 2006/0000352 A1 Jan. 5, 2006

Related U.S. Application Data

(63) Continuation-in-part of application No. 10/871,920, filed on Jun. 18, 2004, now Pat. No. 7,264,648.

(60) Provisional application No. 60/550,343, filed on Mar. 8, 2004, provisional application No. 60/479,592, filed on Jun. 19, 2003.

(51) Int. Cl.
*B01D 53/02* (2006.01)

(52) U.S. Cl. .................. 95/8; 95/11; 95/141; 95/147; 95/148; 95/901; 95/903; 96/111; 96/121; 96/131; 96/143; 96/146; 96/154

(58) Field of Classification Search .................. 95/1, 95/8, 11, 90, 141, 143, 147, 148, 901, 903; 96/108, 111, 121, 131, 143, 144, 146, 154
See application file for complete search history.

(56) References Cited

U.S. PATENT DOCUMENTS

| | | | |
|---|---|---|---|
| 2,397,566 A | 4/1946 | Schutte | |
| 2,590,322 A | 3/1952 | Imhoff et al. | |
| 2,664,967 A | 1/1954 | Molstedt | |
| 3,023,836 A | 3/1962 | Kasbohm et al. | |
| 3,918,934 A | 11/1975 | Kriebel et al. | ................ 55/48 |
| 3,930,803 A * | 1/1976 | Winter | ........................ 96/144 |
| 4,046,530 A | 9/1977 | Izumo et al. | ................... 55/181 |
| 4,047,906 A | 9/1977 | Murakami et al. | ............. 55/79 |
| 4,061,477 A | 12/1977 | Murakami et al. | ............. 55/79 |
| 4,138,506 A | 2/1979 | Eida et al. | ................... 426/598 |

(Continued)

OTHER PUBLICATIONS

Tower, Paul, "Removal of Siloxanes from Landfill Gas by SAG™ Polymorphous Porous Graphite Treatment Systems" Paper presented at SWANA 26th Landfill Gas Symposium Mar. 27, 2003.

(Continued)

*Primary Examiner*—Jason M Greene
(74) *Attorney, Agent, or Firm*—Ronald M. Anderson

(57) ABSTRACT

A plurality of different layers of filter media are used to remove siloxanes from a gas stream. Based on an analysis of the specific gas stream to be filtered, a filter media having an average pore size enabling the preferential removal of a specific class of contaminants is selected for each different class of contaminants. The layers are arranged in sequential order such that contaminants having a higher molecular weight are preferentially removed by the first layers. Collectively, the layers define a segmented activity gradient that enables each class of contaminants present in the gas stream to be preferentially removed in a different layer, preventing removal competition between different classes of contaminants. Preferable adsorption media exhibit a relatively narrow range of pore sizes. Both inorganic adsorption media and carbon-based adsorption media exhibiting a relatively narrow range of pore sizes can be used.

27 Claims, 11 Drawing Sheets

U.S. PATENT DOCUMENTS

| | | | | |
|---|---|---|---|---|
| 4,147,523 | A | | 4/1979 | Izumo .................. 55/208 |
| 4,207,082 | A | | 6/1980 | Okamoto et al. ............. 55/60 |
| 4,259,094 | A | | 3/1981 | Nagai et al. ............... 55/181 |
| 4,303,625 | A | | 12/1981 | Cull .................. 423/213.2 |
| 4,859,216 | A | | 8/1989 | Fritsch .................... 55/28 |
| 4,869,734 | A | | 9/1989 | Jacquish .................. 55/60 |
| 4,902,311 | A | | 2/1990 | Dingfors et al. ............. 55/60 |
| 5,176,798 | A | | 1/1993 | Rodden .................. 202/159 |
| 5,198,001 | A | | 3/1993 | Knebel et al. ............... 55/28 |
| 5,304,234 | A | | 4/1994 | Takatsuta et al. .......... 95/106 |
| 5,383,955 | A | | 1/1995 | Neal et al. .................. 95/34 |
| 5,389,125 | A | | 2/1995 | Thayer et al. ............... 95/11 |
| 5,496,395 | A | | 3/1996 | Yamazaki ................ 96/123 |
| 5,676,738 | A | | 10/1997 | Cioffi et al. .............. 95/109 |
| 5,726,118 | A | | 3/1998 | Ivey et al. ................ 502/417 |
| 5,904,750 | A | | 5/1999 | Cowles .................... 95/109 |
| 6,086,659 | A | * | 7/2000 | Tentarelli .................. 96/131 |
| 6,196,050 | B1 | * | 3/2001 | Ikeda et al. ............... 73/23.2 |
| 6,309,450 | B1 | * | 10/2001 | Millen et al. ............... 96/131 |
| 6,372,018 | B1 | | 4/2002 | Cowles ..................... 95/18 |
| 6,461,411 | B1 | * | 10/2002 | Watanabe et al. .......... 95/116 |
| 6,706,097 | B2 | * | 3/2004 | Zornes .................... 96/153 |
| 6,770,120 | B2 | * | 8/2004 | Neu et al. .................. 95/96 |
| 6,890,373 | B2 | * | 5/2005 | Nemoto et al. .............. 95/90 |
| 7,008,470 | B2 | | 3/2006 | Makino et al. ............. 96/131 |
| 7,008,471 | B2 | | 3/2006 | Koyama et al. ............ 96/131 |
| 7,025,803 | B2 | * | 4/2006 | Wascheck et al. ........... 95/50 |
| 7,101,415 | B2 | * | 9/2006 | Torres et al. ............... 95/115 |
| 7,264,648 | B1 | * | 9/2007 | Wetzel et al. ................. 95/8 |
| 2001/0009125 | A1 | * | 7/2001 | Monereau et al. .......... 96/131 |
| 2003/0075045 | A1 | | 4/2003 | Cowles et al. ............... 95/148 |
| 2005/0150379 | A1 | | 7/2005 | Masetto et al. ............. 95/148 |

OTHER PUBLICATIONS

Press Release Malcolm Pirnie, Engineers, wins "Best New Environmental Technology, Category E" ACEC 2003 Engineering Excellence Awards for SAG™ System installed at BCUA, Little Ferry, NJ, Jan. 10, 2003.

Liang, Kit Y., P.E., Ramon, Li, P.E., Pirnie, Malcolm, "*Removing Siloxanes: Solution to Combustion Equipment Problems*" Paper presented at WEFTEC02 by Malcolm Pirnie Engineers and Bergen County Utility Authority, New Jersey, Oct. 2002.

Glus, Peter H., Liang, Kit Y., P.E., Ramon, Li, P.E., Pope, Richard J., P.E., "*Recent Advances in the Removal of Volatile Methylsiloxanes from Biogas at Sewage Treatment Plants and Landfills*" Paper presented at the Annual Air and Waste Management (AWMA) 2001 Conference in Orlando, Florida. http://www.appliedfiltertechnology.com/page1252.asp.

Gary, Daniel, Acosta, Glenn, Kilgore, John, Min, Seong, Adams, Greg, Lost Angeles County Sanitation Districts Research Project to Remove Siloxanes from Digester Gas Paper presented at the California Water Pollution Controls Conference in Palm Springs, CA, Apr. 2001 http://www.appliedfiltertechnology.com/page1253.asp.

Applied Filter Technology, "*Fuel Cells Thrive on Clean Gas*" Chemical Engineering, Jul. 2000, http://www.appliedfiltertechnology.com/page1254.asp.

Applied Filter Technology, "*Innovative Retrofit Saves Energy*," Tax Dollars Water World, Jan. 2000. http://www.appliedfiltertechnology.com/page1255.asp.

Glus, Peter H., Liang, Kit Y., P.E., Ramon, Li, P.E., Pope, Richard J., P.E., "*Only Three Methods to Control VMSs at Full Scale*" Scrubber Adsorber Newsletter, Feb. 2000. http://www.appliedfiltertechnology.com/page1256.asp.

Liang, Kit Y., P.E., Ramon, Li, P.E., Tudman, Scott, Schneider, Robert, J., P.E., Sheehan, Jerome F., P.E., Anderson, Eric, P.E., Pilot Testing Case Study: Pilot Testing Case Study: "*Removal of Volatile Methylsiloxanes from Anaerobic Digester Gas Fired Engines*" Paper No. 960. Paper presented at the Annual Air and Waste Management (AWMA) 1999 Conference in St. Louis, Missouri http://www.appliedfiltertechnology.com/page1257.asp.

*Tower, Paul, Principal Applied Filter Technology. "New Technology For Removal of Siloxanes in Digester Gas Results in Lower Maintenance Costs and Air Quality Benefits in Power Generation Equipment." *WEFTEC 78th Annual Technical Exhibition and Conference*. Oct. 11-15, 2003. 9pp.

Schweigkofler et al. "Removal of Siloxanes in biogases." Sep. 6, 2000, Journal of Hazardous Materials, p. 183-196.

* cited by examiner

REMOVING SILOXANES FROM A GAS STREAM USING A MINERAL BASED ADSORPTION MEDIA

RELATED APPLICATIONS

This application is based on prior provisional application Ser. No. 60/550,343, filed on Mar. 8, 2004, the benefit of the filing date of which is hereby claimed under 35 U.S.C. § 119(e). The present application is further a continuation in part application of prior conventional application Ser. No. 10/871,920, filed on Jun. 18, 2004, issued as U.S. Pat. No. 7,264,648 B1 on Sep. 4, 2007, which itself is based on prior provisional application Ser. No. 60/479,592, filed on Jun. 19, 2003, the benefits of the filing dates of which are hereby claimed under 35 U.S.C. § 119(e) and 35 U.S.C. § 120.

FIELD OF THE INVENTION

The present invention generally relates to removing trace siloxane contaminants from a gas stream, and more specifically, to employing a filtration system including a plurality of filter beds customized to a gas stream composition, wherein the plurality of filter beds remove the siloxanes both by adsorption and by acting as a molecular sieve.

BACKGROUND OF THE INVENTION

Siloxanes are chemically stable compounds used in many consumer and industrial products, ranging from cosmetics to adhesives. Siloxanes can enhance product flow capability, texture, adhesion, uniformity, and flavor. In consumer products, they are used as a volatile dispersant agent for other organic chemical additives. Siloxanes are also used in many different manufacturing processes, such as the production of silicon based semiconductors.

Siloxanes are saturated silicon-oxygen hydrides formed from atoms of carbon (C), Hydrogen (H), Oxygen (O) and Silicon (Si), and which include at least one chain of alternating silicon and oxygen atoms (—Si—O—Si—). Most siloxanes volatilize rapidly during anaerobic digestion, and also in many manufacturing processes. Common siloxanes are known as volatile methyl siloxanes (VMS), which can be linear molecule or rings structures (cyclomethicones). In cyclical VMS, each Si atom has two methyl-groups ($CH_3$) attached to it. Some of the more common siloxanes include the linear hexamethyldisiloxane ("MM") and octamethyltrisiloxane ("MDM"). Some of the more common cyclical siloxanes are hexamethylcycloclotrisiloxane (referred to as "D3"), octamethylcyclotetrasiloxane (referred to as "D4") decamethylcyclopentasiloxane (referred to as "D5"), and dodecamethylcyclohexasiloxane (referred to as "D6"). "D" is used to represent the repeated dimethyl-silicon-oxygen group in a ring structure and is followed by either an ordinal or a subscript indicating the number of D groups that are present.

Although siloxanes are stable and non toxic, their presence in a gas stream is often undesirable. When present in a fuel gas, such as methane rich gas from a landfill or a digester, siloxanes will be carried throughout the process/treatment facility as a constituent of the methane gas, and under certain temperature and pressure conditions, the siloxanes will cause undesirable silica deposits to form in process-related equipment. For example, siloxanes are known to be present in trace amounts in biogas produced in Waste Water Treatment Plants (WWTP) and landfills. Such biogas is often used as an alternate fuel to run engines that power equipment or produce electrical power. When the biogas is burned as a fuel, the siloxanes cause silica deposits to form in the engines, and such deposits can significantly increase maintenance costs. The silica deposits form on hot engine components, such as cylinder heads. Abrasive silica particles can also become entrained in the engine oil, increasing wear on bearings. The result of silica being introduced into internal combustion engines is a significant increase in engine wear, causing more frequent engine rebuilding and concomitant downtime.

In electrical power generation employing emission catalysts, siloxanes can form a silica film on the catalyst surface, rapidly and significantly reducing the catalyst's activity. This form of damage (or "poisoning") is irreversible, meaning that the catalysts, which are often quite costly, must be replaced.

Siloxanes can also be unintentionally introduced in an industrial process. For example, siloxanes are formed during electronic semiconductor fabrication processes, and can contaminate process gas streams (such as silane) used in the production process. The presence of such siloxanes can lead to an increase in the rejection rate of silicon wafers. In industrial emission control processes, silica deposits (as noted above) can foul solvent recovery equipment and thermal oxidation equipment.

Siloxanes are also often present in gas distribution environments, where methane and/or natural gas is compressed and injected into pipelines for distribution. Siloxanes are sometimes added to compressor oils to increase lubricity and to the pipelines themselves during pigging operations. When the siloxane contaminated gas is combusted as a fuel (such as for heat), silica deposits foul the combustion equipment in a manner similar to the fouling of internal combustion engines described above.

Siloxanes have been found to cause problems such as those noted above when present in concentrations as low as 50 ppbv (parts per billion by volume), which is at or near the state-of-the-art detection limit for most siloxanes. Siloxanes are damaging at such low levels because the negative impact of silica deposition is cumulative. Homogeneous activated carbon filters have been successfully employed to remove some siloxanes; however, the performance of such filters in removing siloxanes from a gas stream is inadequate, clearly leaving room for improvement. Accordingly, it would be desirable to provide a better method and apparatus to effectively remove siloxanes from a gas stream.

As noted above, biogas often includes one of more constituents that complicate the removal of siloxanes from the gas, or whose presence is also undesirable. For example, halogenated organic species (such as chlorinated solvents and chlorofluorocarbons) are also found in biogas. When these halogenated species are burned along with the methane in internal combustion engines, hydrochloric acid is formed, which causes increased corrosion of metal parts. Halogenated species are also poisons to emission catalysts used to control nitrogen oxides (NOx) and carbon monoxide (CO). The presence of heavy organics (such as benzene, toluene, and xylene) in sufficiently high concentrations can adversely affect the removal of siloxanes and halogenated organics.

Clearly, it would be desirable to remove the chlorinated organics, and heavy organics, as well as the siloxanes, from gas streams. One prior art approach uses activated carbon for this purpose. While activated carbon can effectively remove all three of the offending species, breakthrough of these species can occur rapidly, whereupon the media must be replaced. Moreover, the capacity for typical activated carbon comprising bituminous coal-based carbons, coconut shell carbons, or wood-based carbons is limited, requiring their frequent replacement. It would therefore be desirable to provide a more effective system and method for removing siloxanes, chlorinated organics, and heavy organics from gas streams.

In addition, landfill gas is often grossly contaminated with a number of undesirable volatile organic species at high concentrations, some of which render the removal of siloxanes using a carbon filtration media particularly problematical. Among the problematic volatile species often found in landfill gas are oxygenated organics. Oxygenated organics contain one or more oxygen atoms; and include acetates, alcohols, aldehydes, esters, ethers, formates, furals, furans, glycols, ketones, oxides, and other substances. Oxygenated organics can hamper the ability of adsorbent media to remove siloxanes due to several factors. First, oxygenated organics can function as solvents to strip siloxanes already picked up by an adsorbent. Very high concentrations of oxygenated organics can condense in adsorbent media beds and essentially flush siloxanes out of the adsorbent media bed. Second, heavier molecular weight oxygenated organics, such as acetates, can physically displace siloxanes already picked up or captured by adsorbent media, causing the siloxanes to be released back into the gas flow. Removal of siloxanes from a gas stream using a carbon based adsorbent in the presence of oxygenated organics is particularly challenging. It would therefore be desirable to provide a more effective system and method for removing siloxanes from gas streams in which oxygenated organics are present.

SUMMARY OF THE INVENTION

The present invention is a method for removing siloxanes from a gas stream using a mineral-based adsorbent media (i.e., an inorganic-based adsorbent media). The mineral-based adsorbent media can be used alone, or in conjunction with other adsorbent media, particularly carbon based adsorbent media. A key aspect of the present invention is the recognition that certain commercially available mineral-based adsorbent media exhibits a relatively narrow range of pore that vary by grade. Thus a plurality of different grades of mineral-based adsorbent media can be purchased and tested to identify the narrow range of pore sizes exhibited by each different grade. A gas stream can be analyzed to determine the types of siloxanes and other contaminants present to enable selection of an inorganic-based absorbent media having a range of pore sizes corresponding to the particular contaminants to be removed. The source and composition of the mineral-based absorbent media exhibiting a relatively narrow range of pore sizes is discussed in greater detail below. The term "HOX media" is used hereinafter to refer to an inorganic-based absorbent media exhibiting a relatively narrow range of pore sizes.

In one aspect of the present invention, the HOX media are arranged in a filter including a plurality of different layers. In embodiments where the HOX media are used without a carbon based adsorbent media, each layer in the filter bed includes a grade of HOX media having well defined physical properties, such as average pore size and total pore volume. The grade of HOX media in each layer is specifically selected so that the properties associated with that grade preferentially removes a specific class of contaminants from the gas stream. The layers are arranged in sequential order such that contaminants having a higher molecular weight (or molecular size) are preferentially removed by the first layers. Collectively, the layers define a segmented activity gradient that enables each class of contaminants present in the gas stream to be preferentially removed in a different layer, preventing removal competition between different classes of contaminants. Should there be just one class of contaminants in a process gas (such as a fuel gas), then a single layer of specifically selected HOX media would be employed.

When combined with the use of a carbon based absorption media, the HOX media enables siloxanes to be efficiently removed from process gas containing oxygenated organics. In such a system, the HOX media are used to remove the oxygenated organics from the gas stream, and the carbon-adsorbent media are used to remove siloxanes from the gas stream. The HOX media can also be used without carbon adsorbent media, such that the HOX media removes both the oxygenated organics as well as the siloxanes. Different grades of HOX media are employed, such that at least one grade of the HOX media whose pore sizes and other physical properties are particularly well-suited to remove oxygenated organics are utilized, as well as at least one grade of HOX media whose pore sizes and other physical properties are particularly well-suited to remove siloxanes.

HOX media that are generally based on both silica gel and zeolites can be employed, depending on the specific characteristics of the gas stream to be processed. Silica gel is a porous, amorphous form of silica ($SiO_2$). Due to its unique internal structure, silica gel is radically different than other $SiO_2$-based materials, and includes a vast network of interconnected microscopic pores. Conventional silica gel exhibits a relatively broad range of pore sizes, having larger pores than zeolites, with a wide range of diameters (typically between about 5 Å and 3000 Å). Thus, conventional (i.e., not specially modified) silica gel is unusable as HOX media. However, the silica gel industry is a mature industry, and several different chemical manufacturers have learned how to manipulate process techniques to achieve silica gel-related materials that do exhibit a relatively narrow range of pore sizes. These types of modified or enhanced silica gels are therefore also encompassed by the term "HOX media," as used herein. Zeolites are a class of aluminum silicates characterized by relatively small pore sizes that do not vary substantially. Natural and synthetic zeolites are known, and their characteristic tightly controlled pore sizes has lead to zeolites being referred to as molecular sieves. Thus, zeolites, both natural and synthetic, are encompassed by the term "HOX media," as used herein.

The plurality of different grades of HOX media available make it possible to achieve a layered filter bed including an inorganic adsorbent media having different properties, each layer of the filter bed having been selected to preferentially remove a particular class of contaminants from a gas stream. Such mineral-based adsorbent media encompassed by the term "HOX media" are referred to variously when marketed, as enhanced silica gels, modified silica gels, custom silica gels, synthetic silica gels, activated silica, activated silica gel, silicate acid condensation (SAC), synthetic SACs, desiccants, and silicic acid adsorbent. Note that not all products referred to by one of those terms will exhibit a relatively narrow range of pore sizes, and porosity tests or manufacturer's data will need to be consulted to determine whether such a product exhibits a relatively narrow range of pore sizes (hence being usable as HOX media) or exhibits a relatively broad range of pore sizes. HOX media are generally available in powders, granules, spheres, irregular granules, pellets and other shapes.

In one aspect of the invention, samples of available grades of HOX media are analyzed to determine the average pore size and pore volume of each grade. Particularly preferred HOX media, referred to as SAC type gels, are produced from high purity silica sand and sulfuric acid. Preferred HOX media will have an average pore size such that at least 50% of the pores vary within a relatively narrow range, preferably varying plus or minus about 25 nm from an average value, and more preferably varying plus or minus about 5 nm from an average value, and most preferably varying plus or minus about 0.5 nm from an average value. Particularly for siloxane removal, the narrowest range is preferred.

A model is developed, which correlates the pore sizes of available grades of HOX media to classes of contaminants, based on the molecular weight of the contaminant. The model will enable a specific one of the different grades of HOX media to be selected based on the molecular weight of the contaminant. Empirical data can be used to improve the model. A sample of the gas to be treated is taken, and the contaminants to be removed will be identified. For each different class of contaminant, a specific grade of filter media having a pore size expected to preferentially remove that class of contaminant will be identified. The concentration of the contaminant will determine the volume of the selected grade of HOX media required. A multilayer filter bed is constructed using each different grade of HOX media identified by the model, such that HOX media selected to preferentially remove the larger-sized contaminants are disposed closest to the gas inlet, while HOX media selected to preferentially remove the smaller-sized contaminants are disposed closest to the gas outlet.

A particularly preferred embodiment of the present invention combines the use of HOX media with carbon adsorbent media, where both the mineral-based adsorbent media and the carbon-adsorbent media exhibit well-defined pore sizes, and so that the pore sizes of the adsorbent media (inorganic and carbon) are particularly selected based on the composition of the gas stream to be treated. A layered filter bed is provided, wherein each layer includes adsorbent media whose pore sizes are particularly well adapted to removing a specific contaminant or class of contaminants from the gas stream.

Systems in accord with the present invention can include pre-treatment units, post-treatment units, and filter media regenerators. The use of hot inert gas processes or microwave heaters represent particularly preferred regeneration techniques.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 1 is a flowchart which illustrates the overall sequence of steps utilized to design and implement a siloxane removal system in accord with the present invention;

FIG. 2A schematically illustrates a prior art homogenous filter bed in which a plurality of contaminants compete for removal in the filter bed;

FIG. 2B schematically illustrates a filter bed including three sub-gradient layers; each of which exhibits an average pore size specifically selected to favor the removal of a specific class of contaminants, and which collectively define a segmented activity gradient;

FIG. 3 is a block diagram schematically illustrating the elements present in a basic segmented activity gradient siloxane removal system in accord with the present invention;

FIG. 4A schematically illustrates a vertically oriented filter canister including a plurality of sub-gradient layers;

FIG. 4B schematically illustrates a horizontally oriented filter canister including a plurality of sub-gradient layers;

FIGS. 4C and 4D schematically illustrate a radially oriented filter canister including a plurality of sub-gradient layers, in which the gas to be filtered moves from an annular outer volume to an annular inner volume;

FIGS. 4E and 4F schematically illustrate a radially oriented filter canister including a plurality of sub-gradient layers, in which the gas to be filtered moves from an annular inner volume to an annular outer volume;

Figure 5A:
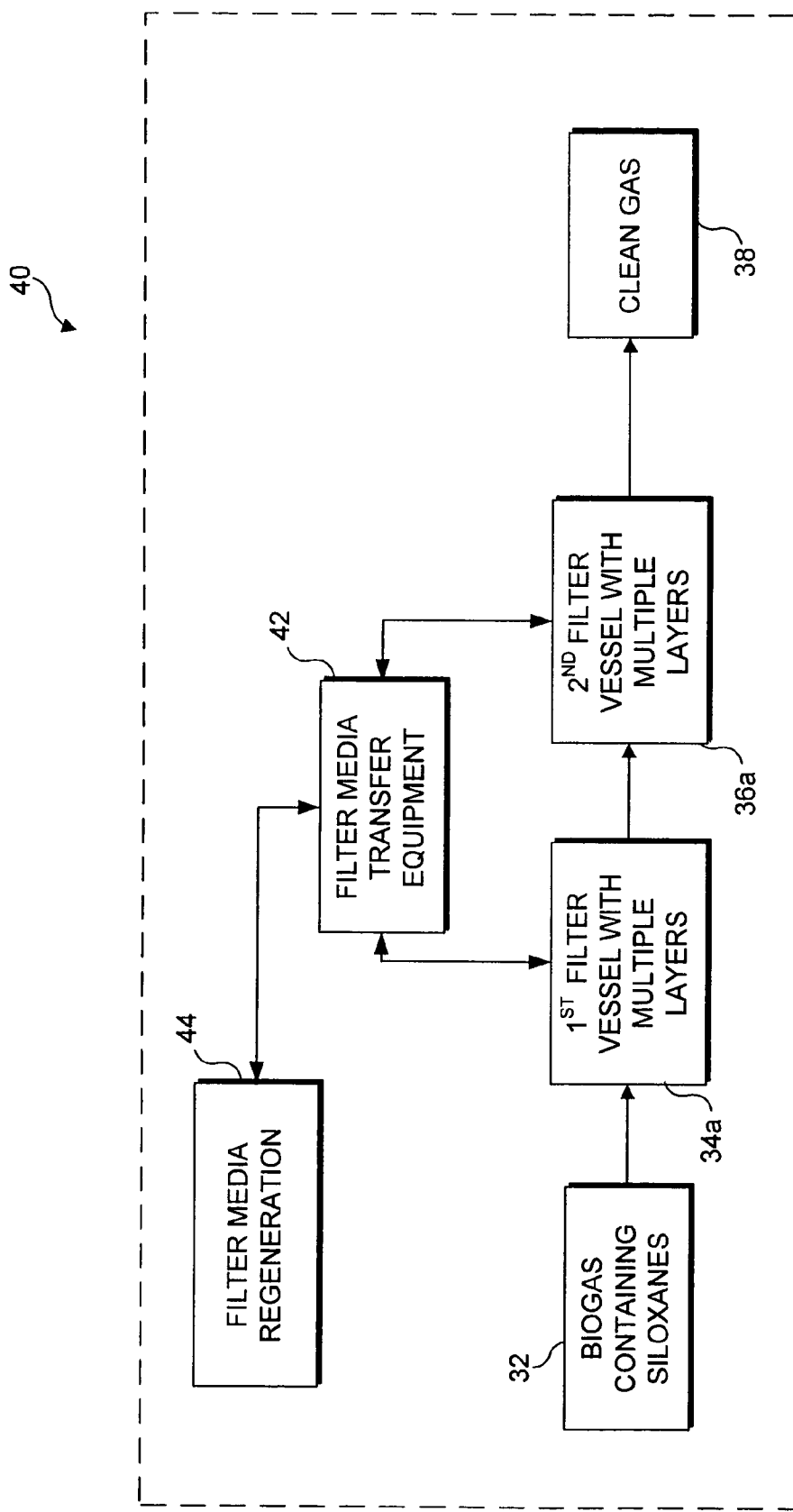
FIG. 5A is a block diagram schematically illustrating the elements present in a segmented activity gradient siloxane removal system which includes a filter media regeneration unit in accord with the present invention.
Figure 5B:
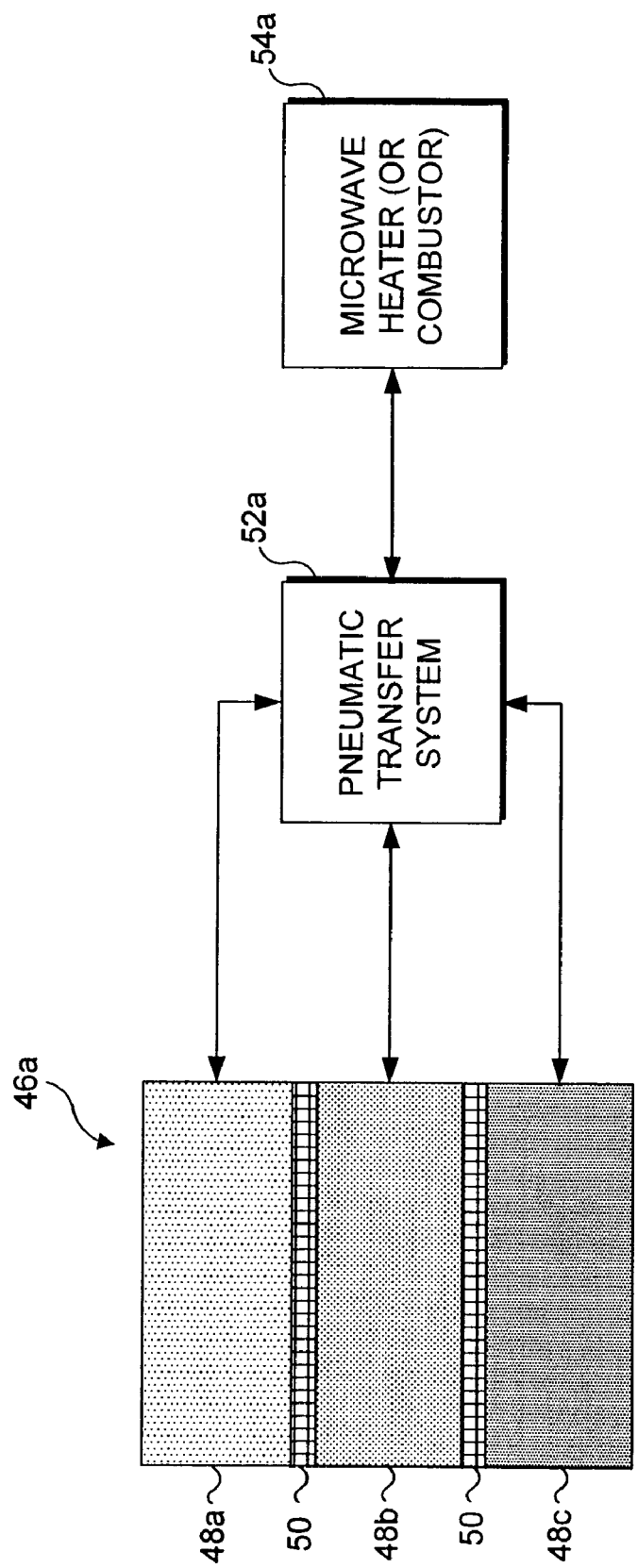
FIG. 5B is a block diagram of a pneumatic transfer system configured to transfer filter media from a filter canister to a microwave heater for regeneration in a batch process.
Figure 5C:
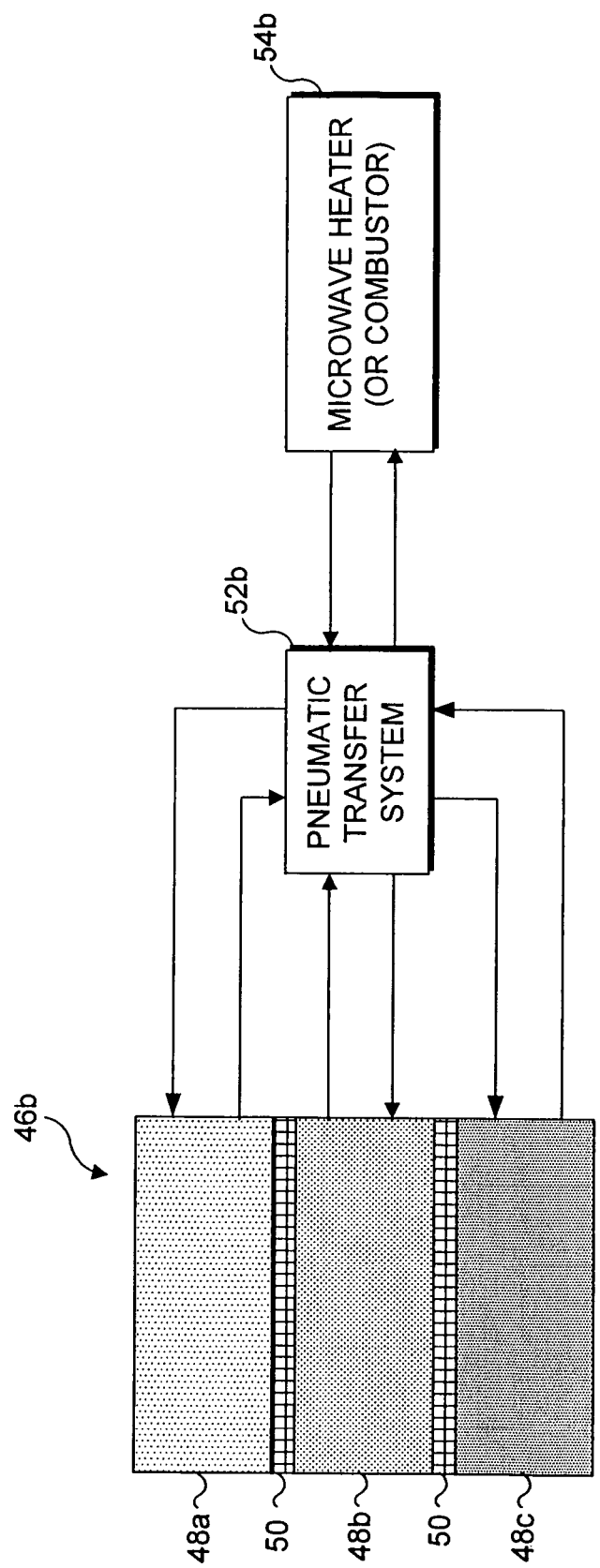
FIG. 5C is a block diagram of a pneumatic transfer system configured to transfer filter media from a filter canister to a microwave heater for regeneration in a continuous process.
Figure 5D:
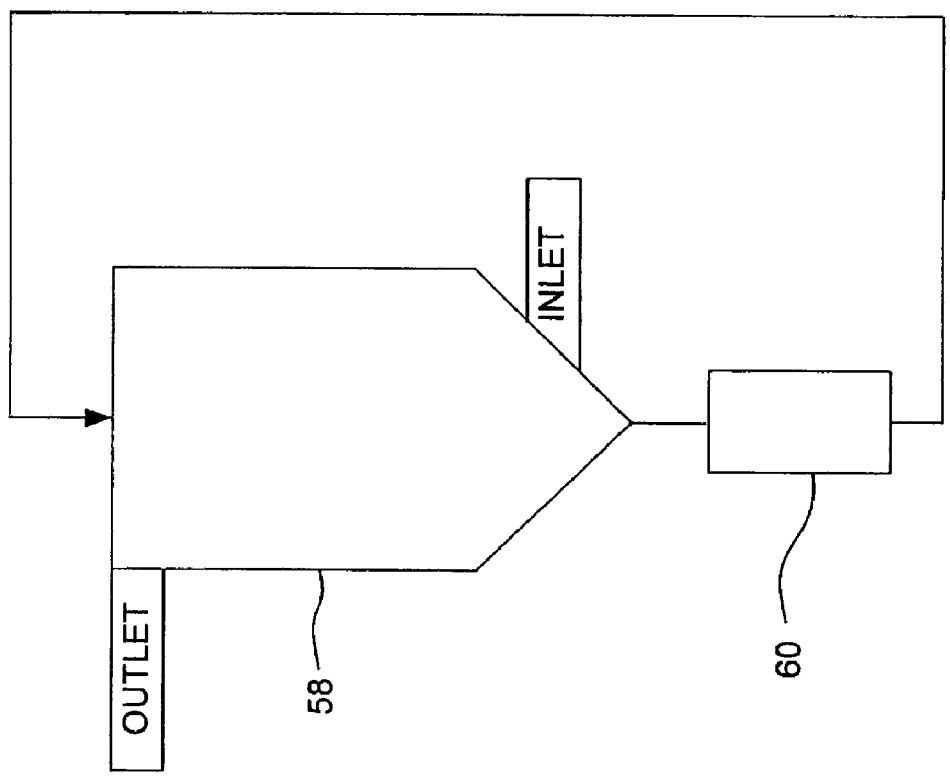
Figure 6:
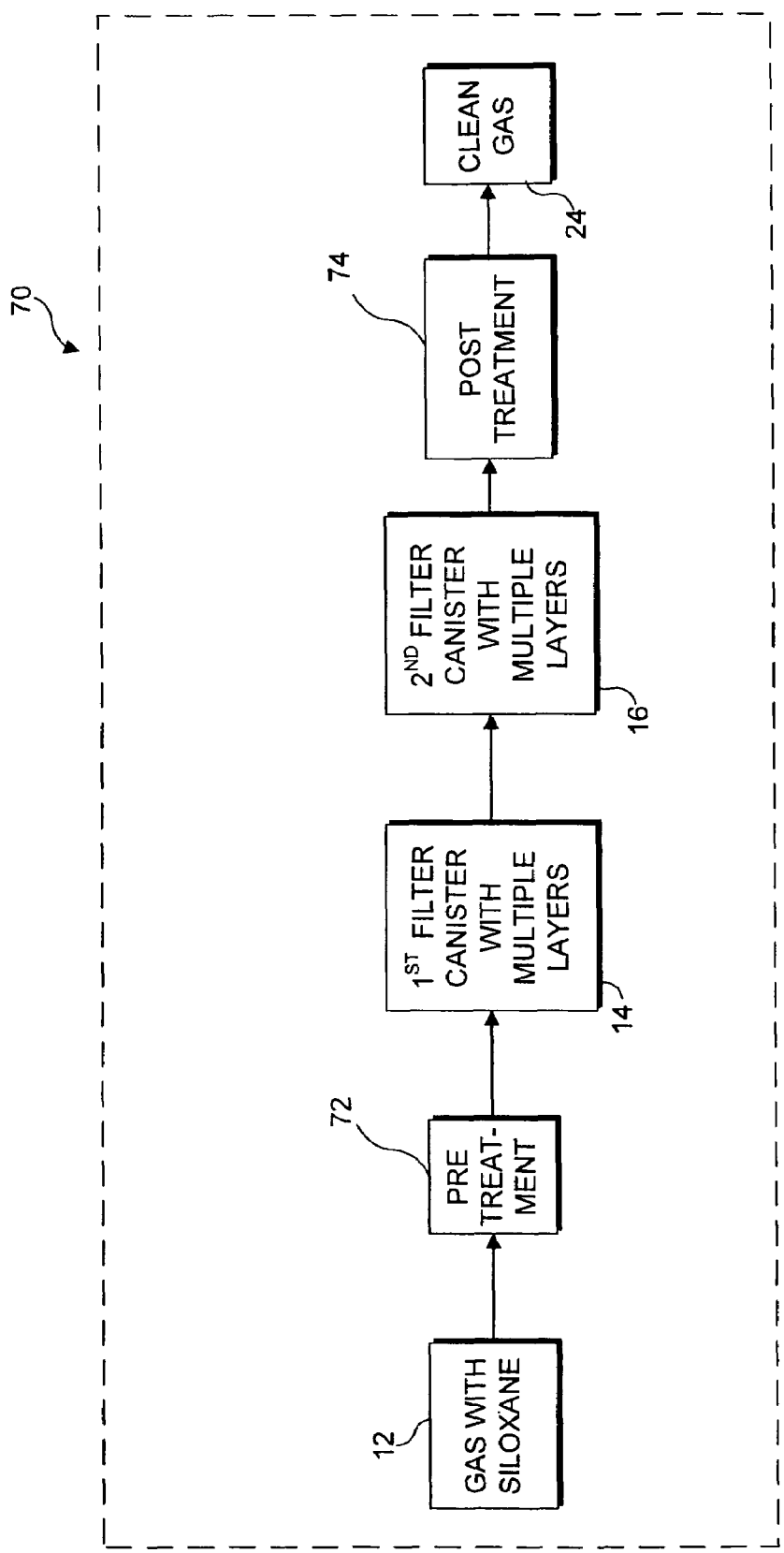

FIG. 5D schematically illustrates a moving bed filter canister in fluid communication with a filter media regeneration unit; and FIG. 6 is a block diagram schematically illustrating the elements present in a segmented activity gradient siloxane removal system which includes pre-treatment and post-treatment processing units.

DESCRIPTION OF THE PREFERRED EMBODIMENT

Overview

In the present invention, a filter media available with a range of properties (such as pore size) that can be tightly controlled is used to filter a gas stream to remove siloxanes. An inorganic filter media, generally similar to silica gel, and a carbon-based polymorphous graphite, both available with tightly controlled properties (including a relatively narrow range of pore sizes), are utilized in various embodiments of the present invention. It should be understood however, that the present invention encompasses the use of the mineral-based adsorbent media alone, as well as the use of the mineral-based adsorbent media with conventional carbon adsorbents.

Preferably, siloxanes are removed from a gas stream using a plurality of different grades of adsorbent media, each grade of adsorbent media having been specifically selected to preferentially remove a single contaminant (or a class of contaminants). Generally, the pore size of the adsorbent media will be a criteria employed to select one grade of adsorbent media over another.

With respect to the drawing figures, each Figure generally refers to a grade or layer of adsorbent material, without specifying whether that grade or layer is implemented using a mineral-based adsorbent media exhibiting a relatively wide range of pore sizes, a mineral-based adsorbent media exhibiting a relatively narrow range of pore sizes (HOX media), a carbon based adsorbent media exhibiting a relatively wide range of pore sizes, or a carbon-based adsorbent media exhibiting a relatively narrow range of pore sizes. It should be understood that the present invention is directed to the following embodiments, although embodiments utilizing adsorbent media exhibiting a relatively narrow range of pore sizes are particularly preferred:

the use of a mineral-based adsorbent media exhibiting a relatively wide range of pore sizes in combination with a carbon-based adsorbent media exhibiting a relatively wide range of pore sizes, to remove siloxanes from a gas stream the use of a mineral-based adsorbent media exhibiting a relatively wide range of pore sizes (HOX media) in combination with a carbon-based adsorbent media exhibiting a relatively narrow range of pore sizes, to remove siloxanes from a gas stream the use of a mineral-based adsorbent media exhibiting a relatively narrow range of pore sizes (HOX media) to remove siloxanes from a gas stream the use of a mineral-based adsorbent media exhibiting a relatively narrow range of pore sizes (HOX media) in combination with a carbon-based adsorbent media exhibiting a relatively wide range of pore sizes, to remove siloxanes from a gas stream the use of a mineral-based adsorbent media exhibiting a relatively narrow range of pore sizes (HOX media) in combination with a carbon-based adsorbent media exhibiting a relatively narrow range of pore sizes, to remove siloxanes from a gas stream.

Before discussing the present invention in detail, it will be useful to review various types of inorganic and carbon-based adsorbents that can be utilized, alone or in combination, in accord with the present invention.

Mineral-Based Adsorbent Media Exhibiting a Relatively Wide Range of Pore Sizes

Silica gel is one of the most widely recognized non-carbon based adsorbents. Silica gel is a granular (or beaded), porous form of silica made synthetically from sodium silicate. Despite the name, silica gel is a solid. It is usually distributed in the form of beads. It was invented at Johns Hopkins University, Baltimore, Md. in the earlier 1900s. Its high porosity, around 800 $m^2/g$, enables it to readily adsorb water (or other chemical species), making it useful as a desiccant (drying agent). Once saturated, the gel can be regenerated by heating the gel until the adsorbed species are driven off. Silica gel is non-toxic, non-flammable and chemically un-reactive. Silica gel will not normally attack or corrode other materials, and with the exception of strong alkalis and hydrofluoric acid, silica gel is itself resistant to attack. The strong adsorption capability of silica gel may cause drying effects on human tissue. Even when saturated with adsorbed chemical species, silica gel still has the appearance of a dry product, its shape remaining unchanged.

The reason silica gel is such an effective adsorbent is that it includes an internal network of interconnecting microscopic pores, yielding a typical surface area of 700-800 $m^2/g$. Stated another way, the internal surface area of a teaspoon full of silica gel is roughly equivalent to the area of a football field. Molecules are adsorbed or desorbed by these micro-capillaries until vapor pressure equilibrium is achieved with the surrounding fluid. In general, the pore size exhibited in traditional silica gel varies over a relatively wide range. As opposed to zeolites (micro porous crystalline solids with well-defined structures, generally exhibiting a relatively narrow range of relatively small pore sizes), inorganic silica gels have larger pores with a wide range of diameters—typically between about 5 Å and 3000 Å—and generally are not useful for separation of molecules solely dependent on their size. Silica gels maintain their structure when activated. Activation frees the large internal surface area and pore volume, enabling physical adsorption and capillary condensation.

Clay desiccant is fairly common in commercial and industrial use. While not as efficient and adsorbent as silica gel, clay desiccant is relatively inexpensive. Clay desiccant is generally produced from Montmorillonite clay, composed primarily of magnesium aluminum silicate, a naturally occurring mineral. After mining, it is purified, reduced to granules, and subjected to a controlled dehydration process to increase its sorbent porosity. It recharges easily and does not swell as it adsorbs water vapor. It works well at low and room temperatures, but has a rather low ceiling temperature. At 120° F., it will begin to desorb or shed the moisture it has adsorbed. This characteristic is an important consideration for storage of the material in hot areas. While clay desiccant is not a particularly preferred mineral-based adsorbent media in the context of the present invention, it may be useful when used in addition to the more preferred silica gels.

Mineral-based adsorbent media exhibiting a relatively wide range of pore sizes can be used to remove siloxanes from a gas stream, because some of the pores will likely be sufficiently large to accommodate the siloxanes. A more efficient system, requiring less inorganic adsorbent, can be achieved if a carbon-based adsorbent media exhibiting a relatively narrow range of pore sizes is also employed, where the pore sizes of the carbon-based adsorbent media have been selected to correspond to the size of the siloxanes to be removed. The mineral-based adsorbent media exhibiting a relatively wide range of pore sizes can be used to prevent other species, such as oxygenated organics, from fouling the carbon-based adsorbent media selected to remove the siloxanes.

Dolomite is a magnesia-rich, sedimentary rock resembling limestone, primarily comprising calcium magnesium carbonate, $CaMg(CO_3)_2$. It is commonly crystalline and is white, gray, brown, or reddish in color, with a vitreous to pearly luster. The magnesium is sometimes replaced in part by iron or manganese. Calcined dolomite is dolomite that has been heated to drive off some of the carbon, thereby increasing the percentage of magnesium by weight and imparting a network of pores. Calcined dolomite can be used in combination with the other adsorbent media described herein.

Mineral Adsorbent Exhibiting a Relatively Narrow Range of Pore Sizes (HOX Media)

As noted above, some common silica gels exhibit a relatively wide range of pore sizes, such that those silica gels are generally not useful for selectively adsorbing chemical species as a function of pore size. However, the silica gel industry has matured sufficiently such that variations in manufacturing processes can enable the production of silica gels exhibiting a relatively narrow range of pore sizes. Manufacturers are currently able to provide silica gels, and other mineral (or inorganic)-based adsorbent media, exhibiting precisely controlled pore sizes. Manufacturing of silica gels can also be carried out so as to enable precise control of surface areas, and to facilitate surface treatment modifications that achieve silica gels appropriate for specific process applications. As noted above, inorganic adsorbent media exhibiting a relatively narrow range of pore sizes are collectively referred to herein as HOX media.

In general, silica gels synthesized with an average pore size of about 20 Å are known as "narrow pore" silica gels, whereas silica gels with an average pore size of about 110 Å and beyond are called "wide pore" silica gels.

In addition to specially processed silica gel, HOX media can be implemented based on: activated silica (AS), silicate acid condensation (SAC), such as synthetic silica gel, and SAC type resins and polymers. These adsorbents can be used alone or in combination with other adsorbents described herein.

In particular, SAC type gels are amenable to being produced with tailored properties, such as exhibiting a relatively narrow range of pore sizes. Manufacturers are able to produce SAC type gels with very distinct and well controlled pore sizes, dramatically unlike the pore structure of conventional activated carbons or conventional silica gel. By empirically measuring the pore size of each grade of SAC type gel filter media, it has been determined that more than 48 distinctly different types of HOX media exhibiting a relatively narrow range of pore sizes are readily available, each with a unique and narrow range of pore sizes. This determination has enabled an improved method for removing siloxane contaminants from gases to be achieved by constructing a single deep layer or several-layered filter bed, wherein the media in each layer has been selected, based on the pore sizes of the media, to selectively favor the removal of one class of the contaminants entrained in the gas stream. Where multiple layers are implemented, the layers are arranged in sequence such that the layer with the largest pore sizes is closest to the gas inlet, and the layer with the smallest pore sizes is closest to the gas outlet.

Two chemical companies that can provide HOX media (including SAC type gels) exhibiting a relatively narrow range of pore sizes are Grace Davison of Columbia, Md., and the Qingdao Haiyang Chemical Company of Qingdao, China.

Another useful class of materials for implementing HOX media are zeolite molecular sieves, which are crystalline, highly porous aluminosilicates. Zeolites are characterized by a three-dimensional pore system, with pores of precisely defined diameter. Generally, they contain silicon, aluminum, and oxygen in their framework and cations, and water and/or other molecules within their pores. Many occur naturally as minerals and are extensively mined in many parts of the world. Others are synthetic and are made commercially for specific uses, or produced by research scientists trying to understand more about their chemistry. The corresponding crystallographic structure is formed by tetrahedras of ($AlO_4$) and ($SiO_4$). These tetrahedras are the basic building blocks for various zeolite structures, such as zeolites A and X, the most common commercial adsorbents. Synthetic zeolites are available. For example, the Qingdao Haiyang Chemical Company of Qingdao, China offers synthetic zeolites that can be beneficially utilized in accord with the present invention.

Zeolites and silica gels function on the basis of the physics of adsorption. Adsorption occurs due to van der Waals interactions and capillary condensation at high humidity. Due to the presence of alumina, zeolites exhibit a negatively charged framework, which is counter-balanced by positive cations, resulting in a strong electrostatic field on the internal surface. These cations can be exchanged to fine-tune the pore size or the adsorption characteristics. For instance, the sodium form of zeolite A has a pore opening of approximately 4 Ångstrom ($4 \times 10^{-10}$ m) and is referred to as a 4 A molecular sieve. If the sodium ion is exchanged with the larger potassium ion, the pore opening is reduced to approximately 3 Ångstrom (i.e., providing a 3 A molecular sieve). On ion exchange with calcium, one calcium ion replaces two sodium ions. Thus, the pore opening increases to approximately 5 Ångstrom (providing a 5 A molecular sieve). Ion exchange with other cations is sometimes used for particular separation purposes.

The adsorption force of SAC type gels is less than the adsorption force for zeolites, resulting in a lower adsorption capacity at low concentrations of adsorbates. However, SAC type gels are available in a wider variety of different pore sizes than are zeolites. Thus, it is more likely that an SAC type gel can be found with a range of pore sizes corresponding to a contaminant to be removed from a gas stream. If a zeolite or synthetic zeolite is available having a pore size that can be used to remove a particular contaminant from a gas stream, then zeolites can also be beneficially employed as an adsorbent in accord with the present invention.

Particularly with respect to HOX media available from the Qingdao Haiyang Chemical Company, useful mineral adsorption media comprise aluminum, calcium, hydrogen, magnesium, manganese, oxygen, potassium, iron, silicon, and sodium. The HOX media varies in color from opaque, off-white, grey, tan, and other colors or combinations of these colors, depending on the grade. The HOX media available as irregular granules or spheres and primarily comprise silicon, hydrogen, oxygen, and sodium (or potassium) with smaller varying amounts of other elements, such as aluminum (as an oxide), are similar to silica gel. The HOX media comprising smaller amounts of silica and greater varying amounts of other elements are more similar to naturally occurring zeolites or diatomites.

With respect to manufactured HOX media, manufactures can readily vary the particular physio-chemical properties of the HOX media, in a manner not easily accomplished with carbon-based media. Of particular benefit is the ability to vary the range of pore sizes in the HOX media to accommodate removal of a broader spectrum of contaminants. The ability to manufacture such HOX media in a wide variety of shapes is also a benefit. Still another benefit is that empirical tests data indicate that the HOX media can adsorb and store a greater volume by weight of contaminants than can carbon or graphite-based media (most likely due to the huge internal volume of HOX media based on silica gel). Since HOX media are not graphite-based, they are not subject to ignition, an important factor to consider in fuel gas processing. Further, some types of HOX media are more easily regenerated thermally, in place, for reuse, providing an additional economy over graphite-based media. Because the pore structure of the HOX media is available in a wide variety of sizes (and manufacturers have the process knowledge required to selectively control pore size), many different contaminants can be adsorbed by selecting HOX media having an appropriate corresponding pore size.

Carbon Adsorbent Media Exhibiting a Relatively Wide Range of Pore Sizes

Commercially available activated carbon, manufactured from wood, sawdust, bituminous coal, rice hulls, lignite, peat, or petroleum residues, generally exhibits a range of pore sizes varying widely in an individual batch, including pores as small as about 0.7 nm to as large as about 10,000 nm. For filtration based on a homogenous bed of activated carbon, some variation in pore sizes is actually a benefit, because the homogenous filter bed will include pores able to facilitate the removal of molecules of widely disparate sizes. While pore sizes in excess of about 500 nm are generally too large to facilitate adsorption of gas molecules, the wide variation of pores sizes from about 0.7 nm to about 500 nm enable activated carbons to serve as a good adsorbent material for a wide variety of materials. Homogeneous activated carbon filter beds can successfully remove a wide range of contaminants from fluids; however, certain compounds, such as siloxanes in parts per million concentration, pose a significant removal challenge for homogeneous activated carbon filter beds.

In the context of the present invention, carbon-adsorbent media exhibiting a relatively wide range of pore sizes will be most effectively utilized in combination with inorganic-adsorbent media exhibiting a relatively narrow range of pore sizes. Empirical data indicate that the use of different grades and types of adsorbent media achieves synergistic effects not achieved using the different grades and types of adsorbent media individually.

Carbon-Adsorbent Media Exhibiting a Relatively Narrow Range of Pore Sizes

Activated carbon produced from anthracite coal (note that anthracite coal is generally disfavored in the United States as a carbon source for activated carbon) can be used to achieve a carbon-adsorbent media exhibiting a relatively narrow range of pore sizes. The Datong HuiBao Company, Ltd., of Beijing, China, produces anthracite-based carbon in pellet form in a number of different pellet sizes and grades. Each distinct grade and pellet size exhibits a very narrow range of pore sizes, as will be discussed in greater detail below. While the production process used by the manufacturer appears to be proprietary, the production process results in a product with very distinct and well controlled pore sizes, dramatically unlike the pore structure of conventional activated carbons. By empirically measuring the pore size of each available grade of anthracite-based carbon filter media, it has been determined that 40 distinctly different types of filter media are available, each with a unique and narrow range of pore sizes. This determination has enabled an improved method for removing siloxane contaminants from gases to be achieved, by constructing a layered filter bed, wherein the media in each layer are selected based on the pore sizes of the media, to selectively favor the removal of one class of the contaminants entrained in the gas stream. The layers are arranged in sequence such that the layer with the largest pore sizes is closest to the gas inlet, and the layer with the smallest pore sizes is closest to the gas outlet.

Using Adsorbent Media Exhibiting a Relatively Narrow Range of Pore Sizes

To achieve removal of siloxanes present in trace amounts, particularly in the presence of oxygenated organics, the pore sizes of each available adsorbent filter media are determined, the composition of the gas to be filtered is determined, and a filter bed is designed that has a layer for each different class of contaminants found in the gas stream. The filter media whose range of pore sizes generally corresponds to the molecular size of a specific class are selected for use in the layer configured to selectively remove that class of contaminant. Empirical data related to the performance of specific grades with specific classes of contaminants are used to further refine a model based on pore sizes and molecular weights of the contaminants. In general, the larger the concentration of a particular class of contaminant, the larger the layer configured to selectively remove that class of contaminant will be.

Most common silica gels have pore sizes that vary from very large to very small in the same batch, with no narrow range of average pore size being present, in contrast with the HOX media (including the customized SAC type gels and zeolites discussed in detail above, available from Grace Davison or the Qingdao Haiyang Chemical Company). It should be noted that while customized SAC-type gels represent a preferred HOX media for use in the present invention, any similar filter media can be employed, so long as a plurality of different grades of filter media are available, and those different grades are distinguishable based on the range of pore sizes exhibited in that grade. In particular, the anthracite coal-based carbons provided by the Datong HuiBao Company are available in a wide variety of grades, each exhibiting a relatively narrow range of pore sizes. Most conventional activated carbons either are only available in a single grade of pore sizes (such as activated carbon from coconut shells, in which most of the pores are of a relatively small size), or have pore sizes that vary from very large (i.e., over 500 nm) to very small (i.e., less than about 1 nm) in the same batch of carbon, but without exhibiting a narrow range of average pore size.

Regardless of the adsorbent employed, pores sizes useful for removal of contaminants from a gas stream range from about 3 nm to about 500 nm. As noted above, pores larger in size than about 500 nm are too large to facilitate the removal of contaminants from a gas stream. A preferable HOX media (or carbon media) should be available in a range of different grades, where the different grades exhibit different average pore sizes. For example, a preferable filter media would be available in a grade whose average pore size is about 3 nm, as well as in other grades that gradually increase in average pore size up to a maximum of about 500 nm. The term average pore size recognizes that there will be some variation in pore sizes for a given grade of filter media, but at least 50% of the pores will vary within a relatively narrow range, preferably varying plus or minus about 25 nm from an average value, and more preferably varying plus or minus about 5 nm from an average value, and most preferably varying plus or minus about 0.5 nm from an average value. Many of the HOX media (generally customized SAC type gels) provided by the Qingdao Haiyang Chemical Company and the anthracite carbon grades provided by Datong HuiBao have pore sizes wherein about 85% of the pores vary plus or minus about 0.5 nm from an average value (i.e. most pores range from about 2 nm to about 3 nm for a first grade, and range from about 2.5 nm to about 3.5 nm for a second grade, and so on). Because the pore size of the filter media very closely corresponds to the size (i.e., the class) of contaminants that will be preferentially removed by the filter media, it is important that the plurality of different grades cover the range of size of contaminants that need to be removed. Thus, even if no grade is available with pores averaging about 300 nm, if there are no contaminants corresponding to that pore size to be removed, the lack of that grade is not important. Commercially available HOX media include grades having pores as small as about 1 nm to as large as about 100 nm. The material provided by Datong HuiBao includes grades having pores as small as about 0.7 nm to as large as about 100 nm. While that range of grades does not include grades having average pore sizes over 100 nm, the range available is particularly well suited to siloxane removal. A key aspect of the present invention is the realization that commercially available HOX media and the materials available from Datong HuiBao could be sorted by pore size, and that the available pore sizes could be used to design a multi-layer filter bed, where each different layer preferentially removed classes of contaminants that included the relatively difficult to remove siloxanes. Filter media from other sources can be tested using conventional techniques to determine the average pore size of the material, and thus, to determine if they express a similar well defined narrow range of pore sizes that can be similarly manipulated to produce a multi-layer filter, where each layer exhibits a pore size that preferentially removes a specific class of contaminants. Available techniques for determining pore size include the Brunauer-Emmett-Teller (BET) model, argon porosimetry, and mercury porosimetry.

The following text first discusses the principles behind the use of multiple layers (with each layer being selected to remove a specific class of contaminants), then discusses the specific properties of the preferred HOX media and polymorphous graphite filter media, and finally, discusses preferred systems and a method of implementing the present invention.

Overall Multi Layer Filter Process Description

The use of a plurality of different layers, each layer being selected to remove a specific class of contaminants, is implemented using a filter bed (the filter bed being disposed in a single container or collectively, in a plurality of different containers) that includes a Segmented Activity Gradient (SAG). Preferably, the plurality of layers include at least one layer of an adsorbent exhibiting a relatively narrow range of pore sizes. More preferably, the SAG will include a mineral-based adsorbent exhibiting a relatively narrow range of pore sizes. The characteristics of each layer are selected to remove, concentrate, and retain a specific class of contaminants. The term SAG refers to the manner in which the individual layers work together to achieve the desired removal of contaminants. The media are arranged in layers, or segments, inside a container, such as metal (or glass, or plastic, though metal is preferred) vessel or column, to achieve the desired effect. The gas flow passes through each media layers or segments in succession. The gas flow can be upward (upflow), downward (downflow), or radial (either outward to inward or inward to outward) through an annulus containing the segments. The media in each layer is specifically selected to remove specific classes of contaminants from the gas (such as a biogas). As the gas passes through these media layers arranged in a certain order, the offending contaminants are removed in a sequential order. This plurality of media layers or segments to effect sequential removal is the gradient. This sequential contaminant removal is characteristic of the SAG process, and is the mechanism by which gas purity and process economy is achieved.

In contrast to the SAG process, a single homogeneous layer of sorptive, adsorptive or sieving media (such as an activated carbon) used for siloxane removal suffers from the adverse effect of the various classes of offending species competing for removal within the same layer of media. The effect of this competition is very poor removal (or no-removal at all) of some of the offending species. Gas purity and the economics of gas purification using a single homogeneous layer of media are often unacceptably poor. It should be noted however, that one aspect of the present invention is the use of a single layer of an inorganic adsorbent exhibiting a relatively narrow range of pore sizes in the layer (as opposed to a SAG), to remove siloxanes from a gas stream.

The media segments in the SAG process gradient are selected based on their ability to remove a certain classes of contaminants. Contaminant classes are based primarily on molecular weight and molecular size. In a typical biogas, there are three to six classes of contaminants, including those of molecular weights from (approximately) below 50, 50 to 75, 75 to 125, 125 to 175, 175 to 250, and above 250. The number of media types selected for a particular gradient is based primarily on the number of classes of contaminants and the concentration of contaminants in each class. For contaminants in the oxygenated organics class, preferably, an inorganic adsorbent media exhibiting a relatively narrow range of pore sizes is employed for one or more of the layers.

Determination of the classes of contaminants in a gas is accomplished, for example, by four test methods. These are: major gas constituents (including total C6+), siloxanes analysis, total volatile organic carbon (VOC) analysis and determination of sulfur-containing species.

The classification of the VOCs and their commensurate concentrations enables the gradient (i.e., the number and composition of each of the plurality of layers) to be defined. For example, a first grade of filter media are selected to specifically remove high molecular weight VOCs and siloxanes (i.e., by selecting a grade of filter media whose average pore size preferentially removes such compounds). Another grade of filter media are selected for removal of medium molecular weight siloxanes (again by selecting a grade of filter media whose average pore size preferentially removes such compounds). A third grade of filter media are selected for removal of low molecular weight siloxanes and other silicon-bearing organics, including those belonging to the alcohol and ether classes (i.e., trimethylsilanol and disilyl ether). Other media grades can be selected (based on the average pore size of the media) to remove very heavy molecular weight organics and the low molecular weight chlorinated species. Segmenting such media layers in the filter chamber in a preferred order with respect to the gas flow direction produces a working gradient over which the removal of the offending species occurs. The media layer depths vary in proportion to the concentration of VOCs and siloxanes in the various classes in the biogas (i.e., the more of a specific class of contaminants that is present, the thicker the layer engineered to remove that class should be).

Layers are selected by matching the average pore size of the grade of filter media to the molecular weight of the contaminant. Logically, larger molecules will require larger pores. An initial model relates an average pore size to a range of molecular weights by comparing calculated molecular sizes to empirically measured pore sizes. Empirical knowledge can be used to refine such a model. For example, based on calculated molecular sizes, one might conclude that filter media grade X will preferentially remove contaminant A (the average pore size of filter media grade X being slightly larger than the calculated molecular size of contaminant A). Empirical data collected based on removing contaminant A using filter media grades X, Y, and Z might indicate that filter media grade Z (the average pore size of filter media grade Z being larger than the average pore size of filter media grade X) are more effective at removing contaminant Y than filter media grade X. Such empirical data can be used to improve the model used to identify the grade of filter media that should be employed to preferentially remove certain contaminants.

It is very difficult to accurately measure the "size" of molecules; thus, collecting and using empirical data will enable a much better model to be developed. Initially the molecular weights of contaminants can be used to determine whether the filter media selected should have pores sizes that are generally at the smaller end of the range of available pores sizes, or at the larger end of the range of available pores sizes (contaminants with larger molecular weights will require larger pore sizes). Particularly when several grades of filter media are available with closely related pore sizes, empirical data can indicate which of those grades provides the best removal efficiency for a particular contaminant. A table that relates molecular weight to a range of pore sizes is provided below and can be used as an initial starting point for selecting a grade of filter media, until empirical data indicate that a different grade is more effective at removing a particular compound.

The Steps Required to Implement the SAG Process

Figure 1:
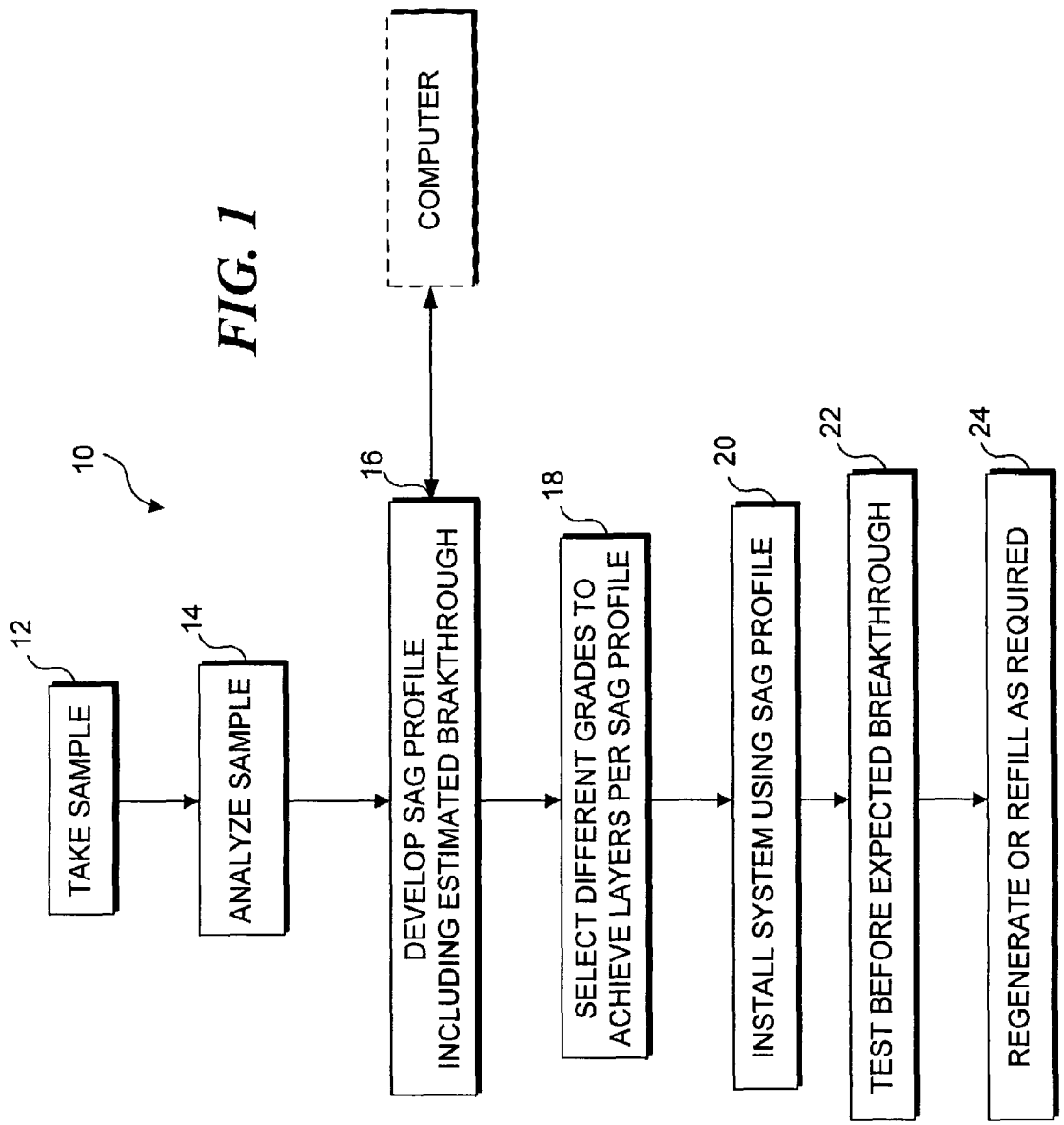

FIG. 1 is a flowchart 10 which illustrates the overall sequence of steps utilized to design and implement a siloxane removal system in accord with the present invention. In a block 12, a sample of the gas to be filtered is taken. In addition to taking a sample, a determination of the following gas parameters needs to be made: a determination of biogas flow, a determination of the temperature of the biogas, and a determination of the pressure of the biogas. In a block 14, the sample is analyzed. The analysis of the gas sample will includes testing the gas (a biogas or other gas potentially contaminated with siloxanes) for siloxanes, VOCs, and sulfur compounds. The contribution to the overall VOC burden in the gas is determined, and its proportion as a percentage of the total VOCs is calculated. In a block 16, a SAG profile is developed (i.e. a determination of how many layers will be required, and what the optimal composition and depth of each layer will be), preferably using computer program that correlates molecular sizes of the known contaminants to the pore sizes of available adsorbent media. In a block 18, different grades of the polymorphous graphite filter media and/or the customized SAC type gel (i.e., an inorganic adsorbent exhibiting a relatively narrow range of pore sizes) are used to achieve the layers determined in block 16. In a block 20, a system is installed based on the SAG profile developed in block 16. In a block 22, the filtered gas is analyzed to determine if breakthrough of the SAG filter beds has occurred (indicating one or more layers of the filter media need to be replaced or regenerated). In a block 24, one or more of the SAG media layers is replaced or regenerated.

Additional details relating to block 16, in which the SAG profile is determined based on the specific gas composition, will now be described. It should be noted that more contaminants can be removed in a properly engineered SAG filter than can be removed in a homogeneous media bed filter, because in a SAG filter species removal occurs in a certain zone (i.e. layer), and competition for adsorption sites in that layer from other species is significantly reduced or eliminated. For example, if it is desired to remove the siloxane species MM, D4 and D5, a layer of filter media is selected (based on the pore size of the media, the molecular weight of D4, and any empirical knowledge indicating which grade is most suited to removing D4), a layer of filter media is selected to favor the removal of D5 (based on the pore size of the media, the molecular weight of D5, and any empirical knowledge indicating which grade is most suited to removing D5), and a layer of filter media is selected to favor the removal of the MM (based on the pore size of the media, the molecular weight of MM, and any empirical knowledge indicating which grade is most suited to removing MM). If it is also desirable to additionally remove benzene, toluene, ethyl benzene, and xylenes (collectively referred to as BTEX compounds), a layer of filter media selected to optimize removal of BTEX compounds would be employed. If it is also desirable to remove lower molecular weight organics, including chlorinated species, yet another layer of filter media selected to optimize removal of such species would be employed. If the proportion of oxygenated organics is above 5% of the total VOC burden of the gas, a layer of an inorganic adsorbent media exhibiting a relatively narrow range of pore sizes (such as the customized SAC type gels discussed in detail above) would be included. The various layers (sub-gradients) of media employed to perform the desired level of gas purification constitute the gradient. The gradient, G, established for the removal of any species, can be expressed as follows:

$$G = \Sigma(g_1 + g_2 + \ldots g_n)$$

The average gradient property with respect to the removal of a certain class of contaminants (such as the siloxane MM) is the sum of the individual sub-gradient (g) properties ($g_p$), as measured by the work performed (such as the moles removed) by each sub-gradient:

$$G_{pavg} = \frac{\sum(g_{p1} + g_{p2} + \ldots g_{pn})}{n}$$

For example, if segments $g_1$ and $g_2$ are installed for removal of contaminant species other than the siloxane MM, then $g_{p1}$ and $g_{p2}$ could equal zero, and a third media segment, and perhaps even a fourth media segment would have a value greater than zero specifically for siloxane MM.

The gradient, G, is further defined by the Range of work performed by each sub-gradient (i.e. each engineered media layer) below and above the average work performed. This gradient range, $r_G$, is defined as $r_G = G_{p_{avg}} \pm 0.10SI$, $r_G = G_{p_{avg}} \pm 0.25SI$, $r_G = G_{p_{avg}} \pm 0.50SI$ or $r_G = G_{p_{avg}} \pm 1.0SI$. The term SI is the "Siloxane Index": of the filter media, a dimensionless value empirically derived from a specific media's capacity for a specific siloxane, the orthobaric liquid density of the specific siloxane, and the volumetric density of the media.

Based on the specific composition of the gas stream to be filtered (based on the sample analysis), the gas contaminants can be separated into different classes, according to the molecular weight of the contaminants. The molecular weight of the different classes are compared with the porosities of the different grades of filter media available. Preferably, a computer model is developed that includes all of the pore sizes available in the different grades of filter media and a theoretical range of molecular weights that each different pore size will preferentially remove. Initially, the model can be constructed using physical data known about each type of contaminant likely to be present in the gas stream to be filtered. Such physical data will include the molecular weight of the contaminant and will often include an estimate of the size of each contaminant molecule. An initial assumption that a preferred pore size will be about 10-50% (and more preferably about 10-25%) larger than the contaminant molecule to remove will be made, enabling the model to suggest a particular grade of filter media (based on the pore size of that grade) for a particular contaminant (or class of contaminant). As empirical data are collected relative to the use of certain grades of filter media with specific contaminants, changes can be made to the model to improve it. The computer model currently being used includes a mixture a theoretical data and empirical data, and provides a very accurate indication of the grades of filter media that should be used for a particular mix of contaminants.

Each class of contaminants (i.e., contaminants of closely related molecular weights) will be assigned a specific grade of filter media. The volume of filter media required is a function both of the removal efficiency for that class, and the concentration of the contaminant. In general, the higher the concentration of the contaminant, the more filter media will be required. Similarly, the lower the removal efficiency for a particular class of contaminants is, the more filter media are required. The layers will be arranged in sequence such that the larger the pores of the filter media, the closer that layer will be to the gas inlet. This ensures that larger molecules are removed first, such that those larger molecules do not "clog" the smaller pores of the latter layers of filter media.

Preferably, each grade of filter media will be of a common size and shape, such that a physically uniform filter bed can be achieved (even though different layers in that bed will have different pore sizes). This simplifies flow rate calculations, and enables conventional gas processing relationships to be used to determine how much of each filter media is required, based on a given flow rate and a given mix of contaminants. It should be noted that empirical studies have indicated that siloxane removal using the SAG and the preferred carbon filter media or HOX media exhibiting a relatively narrow range of pore sizes (such as the customized SAC type gels discussed above) is enhanced by the use of flow rates that are substantially lower than normally employed in conventional activated carbon beds. Preferred flow rates range from about 4 fpm to about 28 fpm, with a particularly preferred range being from about 4 fpm to about 15 fpm. Conventional activated carbon filtration uses flow rates from as low as 50 fpm to as high as 125 fpm.

Figure 2:
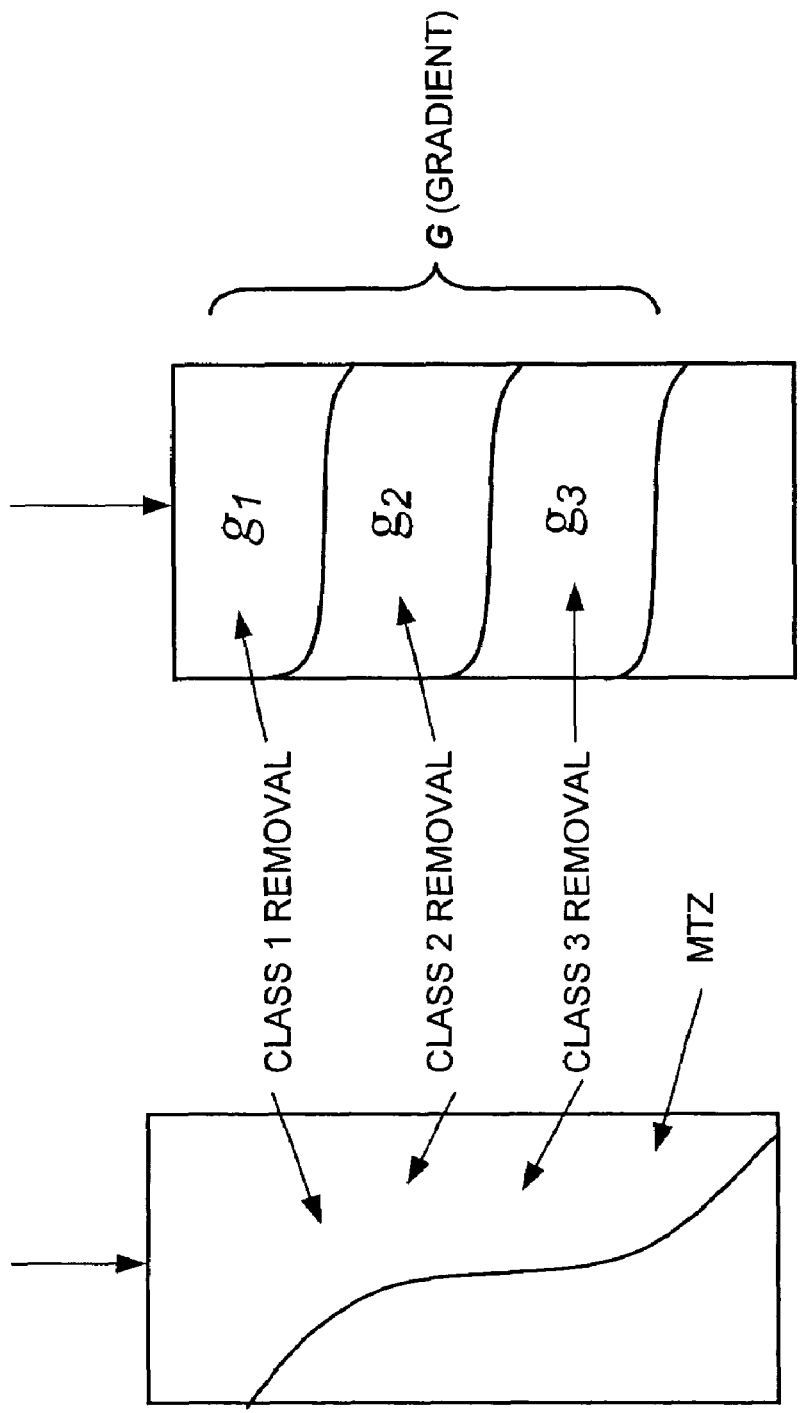

To enhance the performance of anaerobic digesters in WWTP, such anaerobic digesters are often operated at high temperatures. The use of thermophilic anaerobic bacteria enables the high temperature operation and production of methane. Unfortunately, this higher temperature also leads to higher volatilization of undigested organics such as BTEX compounds and low-to-medium molecular weight chlorinated organics. Thus, a typical biogas stream may include siloxanes, BTEX compounds, and low-to-medium molecular weight chlorinated organics. With respect to activated carbon, high molecular weight siloxanes are strongly adsorbed molecules, and will be preferentially adsorbed over the BTEX compounds, which in turn, are preferentially adsorbed over the low-to-medium molecular weight chlorinated organics. In a typical homogenous activated carbon bed (i.e., no sub-gradient layers), molecular species from the above three groups (siloxanes, BTEX compounds, and low molecular weight contaminants) will compete for the same adsorption sites. Unfortunately, some of the siloxanes will not be adsorbed, because they will be too large to be accommodated by the pores of the activated carbon. Some of the low-to-medium molecular weight chlorinated organics will not be adsorbed because they will be displaced by the BTEX compounds. In an adsorbent bed such as activated carbon, the zone in which removal of the molecular contaminants occurs is called the Mass Transfer Zone, or MTZ. A simple definition of the MTZ is the zone between the part of the media bed where there is no removal and the part of the media bed where there is 100% removal. It is estimated that in typical applications, the depth of the MTZ is between 50 and 100 mm for removal of a homogeneously contaminated (one contaminant) gas or air stream. However, when a digester or landfill gas stream passes through an activated carbon bed, this MTZ will contain a mixture of all adsorbable species and can "stretch" to beyond the length of the media bed. Landfills that are operated at high temperatures will produce methane gas that contains more oxygenated organics than digester gas, requiring the use of the customized SAC type gels (i.e. an inorganic adsorbent exhibiting a relatively narrow range of pore sizes) to effectively remove the siloxanes. This is because unless the SAC type gels are used to adsorb the oxygenated organics, those oxygenated organics will act as a solvent and cause the siloxanes to be desorbed from the other layers of the filter bed, particularly where carbon-based media are used to adsorb the siloxanes As the more strongly adsorbed species accumulate toward the leading edge of this zone, they will "push off" or displace less strongly adsorbed species. These displaced species will move further into the bed, where this process of adsorption and displacement is repeated until breakthrough from the bed occurs. This process in a prior art homogeneous filter is illustrated in FIG. 2A. In contrast, FIG. 2B schematically illustrates a filter bed including three sub-gradient layers g1, g2, and g3, each of which have been engineered to favor the removal of a specific one of three different classes of contaminants. Collectively, the three sub-gradients form a gradient. Thus, in the SAG process, more than one type of filter media (or sub-gradient) is required. These media are selected based on the types of molecules that are to be removed and their relative concentrations. Completion of a gradient can require the use of 3, 4, or even 5 or more different sub-gradients. By segmenting the filter bed into different media zones, competition for removal among the species is greatly reduced or eliminated, which results in a higher removal capacity for all of the species being removed. The direct result of this higher capacity is more complete removal, longer run times, and a more economical operation.

It is important to understand that individual layers (i.e., individual gradients) may not be different in chemical composition (i.e., each layer may be anthracite-based carbon or customized SAC type gel filter media). Instead, each layer may differ in the average size of the pores in that layer of filter media.

The Polymorphous Graphite Media

The different grades of polymorphous graphite media (PMG) media used in the SAG process are manufactured from graphite electrode grade anthracite, which is also used in the manufacture of graphite electrodes for purposes such as the smelting and refining of aluminum metal. The preferred supplier of the PMG media for the SAG process is Datong HuiBao Company, Ltd., of Beijing, China. The PMG material is provided as generally cylindrical pellets, about 8 mm in length. The PMG media are manufactured by a process considered by Datong HuiBao to be a trade secret, and are marketed by Datong HuiBao as HBC1 (1.0 mm diameter pellets), HBC2 (1.5 mm diameter pellets), HBC3 (2.0 mm diameter pellets), HBC4 (3.0 mm diameter pellets), and HBC5 (4.0 mm diameter pellets). Each different diameter is available in 8 grades, and empirical data have verified that each diameter and grade exhibits a unique and narrow range of porosity. For example, empirical testing (based on argon porosimetry) has identified one specific grade in which the average pore sizes range from about 1.5 nm to about 2.0 nm, another specific grade in which the average pore sizes range from about 2.0 nm to about 3.0 nm, and yet another specific grade in which the average pore sizes range from about 2.5 nm to about 3.5 nm.

Each batch received is tested to determine the average pore size of the batch, and to confirm that the pore sizes in a specific batch vary over a relatively narrow range (preferably, plus or minus about 5 nm, and more preferably, plus or minus about 0.5 nm). Thus, any changes in the manufacturing process that might affect the pores sizes will be noted. While it appears that Datong HuiBao is the only supplier of the preferred PMG material, other vendors could be utilized if empirical porosity data indicate that different grades of filter media exhibit narrow ranges of average pore size (i.e., preferably, plus or minus about 5 nm, and more preferably, plus or minus about 0.5 nm). The narrower range is preferred for siloxane removal, but if a SAG process is to be used to filter other contaminants, other broader ranges could be useful.

Typically, PMG media of one size (i.e., of the same average diameter and length) are used to construct a SAG process gradient (to achieve a physically uniform bed), although it is possible to, use different sized media within the same gradient. The gradient is constructed of PMG media with at least three different sub-gradient layers (although some very simple gas streams might require only two layers), and each sub-gradient layer has a unique range of pore sizes. The pore size ranges are selected based on the types of contaminants desired to be removed. Lower molecular weight contaminants will be removed in the PMG media layers with smaller pores (2.0 nm and smaller), and higher molecular weight contaminants will be removed in PMG media layers with larger pores (>2.0 nm and up to 10 nm).

PMG differs from activated carbon in that the different types of PMG available enable control of pore sizes in a sub-gradient to be achieved. Control of pore sizes within a sub-gradient enable the sub-gradient to be "tuned" to preferably remove specific classes of contaminants. Where activated carbon filtration is typically implemented as a single layer, the SAG process using PMG media utilizes multiple layers (sub-gradients) to remove contaminants in a preferred order to achieve better overall removal, and to protect succeeding layers of the PMG media from fouling by larger molecules that would hamper their proper function. The layers are ordered so that larger molecules are removed first, and smaller molecules are removed last.

PMG differs from activated carbon not only because of the narrow range of pore sizes in the different grades of PMG, but also in its ability to be regenerated by microwave radiation. The chemical make-up of PMG media permits uniform heating and does not arc (i.e., does not generate sparks) during microwave irradiation, as many other activated carbons do. Activated carbons that are made from bituminous coal, lignite, wood (and sometimes even coconut shell) contain ash, which is mineral in nature. The ash levels in conventional activated carbon (i.e., activated carbons not made from anthracite) vary from about 2-3% ash for good, clean coconut shell carbon to as high as 30% ash for some bituminous coal-based carbons. The preferred anthracite based PMG media usually varies between 2% and 6% ash. If the ash level in the activated carbon is too high, arcing can occur during microwave irradiation, which can not only damage the magnetron and weaken other metal parts in the regeneration equipment, but can also cause very uneven heating and poor regeneration of the media. Naturally, arcing in a fuel gas environment is undesirable from an explosion or fire standpoint, which is a primary reason microwave energy is not employed to regenerate activated carbon. While low ash coconut shell activated carbon could be regenerated using microwaves, coconut shell based activated carbons are not well-suited to siloxane removal in general, and the characteristic flake structure of coconut shell activated carbon is more difficult to move using pneumatic transfer equipment than the anthracite-coal based pellets noted above.

HOX Media

The different grades of HOX media exhibiting a relatively narrow range of pore sizes are manufactured from inorganic materials by several companies, generally as indicated above. The preferred supplier of the HOX media is the Qingdao Haiyang Chemical Company. HOX media are available in a plurality of grades, and a plurality of forms, including powders, pellets, spheres, regular granules, and irregular granules. The majority of the available HOX media are based on synthetic silica gels and synthetic zeolites.

Each batch received is tested to determine the average pore size of the batch, and to confirm that the pore sizes in a specific batch vary over a relatively narrow range (preferably, plus or minus about 5 nm, and more preferably, plus or minus about 0.5 nm). Any changes in the manufacturing process which might affect the pores sizes should be noted. While Qingdao Haiyang Chemical Company is a preferred supplier of HOX media, the silica gel industry and zeolite industries are mature, and other vendors could be utilized if empirical porosity data indicates that different grades of filter media exhibit narrow ranges of average pore size (i.e., preferably, plus or minus about 5 nm, and more preferably, plus or minus about 0.5 nm). The narrower range is preferred for siloxane removal, but if a SAG process is to be used to filter other contaminants, other broader ranges could be useful.

Typically, HOX media of one size (i.e., of the same average diameter and length) are used to construct a SAG process gradient (to achieve a physically uniform bed), although it is possible to use different sized media within the same gradient. The gradient is constructed of HOX media with at least three different sub-gradient layers (although some very simple gas streams might require only a single layer), and each sub-gradient layer has a unique range of pore sizes. The pore size ranges are selected based on the types of contaminants desired to be removed. Lower molecular weight contaminants will be removed in HOX media layers with smaller pores (2.0 nm and smaller) and higher molecular weight contaminants will be removed in HOX media layers with larger pores (>2.0 nm and up to 10 nm).

HOX media differs from conventional activated carbon and conventional silica gel in that the different types of HOX media available enable control of pore sizes in a sub-gradient to be achieved. Control of pore sizes within a sub-gradient enable the sub-gradient to be "tuned" to preferably remove specific classes of contaminants. Where activated carbon filtration is typically implemented as a single layer, the SAG processing using HOX media utilizes multiple layers (sub-gradients) to remove contaminants in a preferred order to achieve better overall removal; and to protect succeeding layers of the filter media from fouling by larger molecules or oxygenated organics that would hamper their proper function. The layers are ordered so that oxygenated organics are removed first, large molecules are removed second, and smaller molecules are removed last.

HOX media differs from activated carbon not only because it is manufactured from a different base material, but also because of the distinct range of pore sizes in the different grades and also in its ability to be easily regenerated by any appropriate thermal means and re-used. A particularly useful regeneration technique employs a hot inert gas. HOX media can be pneumatically moved from the contactor vessel to a separate vessel, where it is heated to nominally 600 degrees F., cooled and returned to the contactor vessel.

Manufacturers of HOX media (i.e., inorganic adsorbent media exhibiting a relatively narrow range of pore sizes) can often modify their product based on specific requests. One modification that can be beneficially employed in the present invention is introducing a color coding into the various grades of HOX media. Because HOX media are available in many different grades, and the physical appearance of many of these grades is substantially identical, it would be beneficial to be able to use a color coding system to quickly differentiate each grade from another, without having to resort to a detailed analysis to determine the range of pore sizes associated with the particular grade. A critical feature of the present invention is selecting an adsorbent media having a narrow range of pore sizes corresponding to a particular contaminant to be removed from a gas stream. If an adsorbent media A having a range of pore sizes that will facilitate the adsorption of contaminant X is difficult to physically distinguish from an adsorbent media B (having a range of pore sizes that will not facilitate the adsorption of contaminant X), then there is a reasonable possibility that adsorbent media B might be inadvertently used in place of adsorbent media A. Color coding the different grades of the inorganic adsorbent media exhibiting a relatively narrow range of pore sizes should greatly reduce the chance that an inappropriate grade of adsorbent filter media will be selected.

It should be noted that both PMG adsorption media (i.e., carbon adsorption media exhibiting a relatively narrow range of pore sizes) and HOX media (i.e., inorganic adsorbent media exhibiting a relatively narrow range of pore sizes) that were discussed above have been empirically shown to be suitable for removing siloxanes from gas streams. Significantly, empirical studies have indicated that HOX media are 30% to 300% more effective at removing siloxanes from gas streams than PMG adsorption media, depending on the characteristics of the gas stream. In particular, HOX media are notably more effective in the presence of oxygenated organics.

Preferred Analytical Methods for Analyzing Gas Samples

The media in each sub-gradient in the SAG process gradient are selected based on their ability to remove each of the certain classes of contaminants. Contaminant classes are based primarily on molecular weight and molecular size. As noted above, in a typical biogas, there are three to six classes of contaminants, including those of molecular weights from below (approximately) 50, and from 50 to 75, 75 to 125, 125 to 175, 175 to 250, and above 250. An additional important class of contaminants, the oxygenated organics, falls between molecular weights of just below 50 to just above 175. The number of media types selected for a particular gradient is based primarily on the number of classes of contaminants and the concentration of contaminants in each class.

Determination of the classes of contaminants in a biogas is accomplished by several test methods. The first method is siloxane analysis by the chilled methanol impinger method. This test is performed by bubbling a specified volume of the biogas through two midget gas impingers each containing nominally 15 milliliters of high purity grade methanol. The siloxanes in the biogas are dissolved in the methanol, which is kept chilled at about 40 degrees Fahrenheit until analyzed. The methanol from these impingers is analyzed by gas chromatography and mass spectrometry to determine both the species of siloxanes present and their individual concentrations. These data are in turn used to calculate the concentration of each siloxane present in the biogas.

Sampling of the gas can be accomplished by either a one liter Tedlar bag or evacuated metal canister containing one to two liters of the biogas is adequate to perform the remainder of the tests required. The second test method used to determine the classes of contaminants in the biogas is the EPA Method TO-14A or EPA Method TO-15. Either method determines the presence and concentration of contaminants appearing on a list of 62 individual species. This test method is useful for identification of the halogenated and other highly volatile contaminants typically present in landfill gas, but which are also found in municipal digester gas. A properly equipped laboratory will be able to also identify contaminants in addition to those on the list of 62. Mass spectral matches of gas chromatography elutriation peaks often produce an additional 10 or 20 contaminants that are reported as "tentatively identified compounds" or "TICs".

The third test method to determine contaminants in biogas is a modified EPA Method 18. This test method is based on gas chromatography and mass spectrometry; however, instrument calibration to accommodate a contaminant concentration range of more than seven orders of magnitude is possible. This broad range of contaminant quantification renders the modified EPA Method 18 an extremely useful tool for analyzing highly contaminated biogases.

The fourth test method employed to determine contaminants in biogas is specific to sulfur-containing species. In addition to hydrogen sulfide, 19 other sulfurous species are identified and quantified by the ASTM D5504 method. This test utilizes a gas chromatograph equipped with a sulfur chemiluminescence detector (SCD) to measure inorganic and organic sulfur species down to the low parts per billion by volume (ppbv) level.

The combined results of the four test methods described above have yielded a list of biogas contaminants that exceeds 250 in number and is increasing as new species are discovered. As new species are encountered, the model is updated to relate each species with a grade of filter media that can be used to preferentially remove that species.

Customizing the Gradient (and Sub-Gradients) to the Sample Analysis

Results from the various biogas contaminant tests are analyzed with a computer to determine the proper media types and quantities of each to use for purification, using the computer model discussed above. Combinations of HOX media and PMG media can be used, as well HOX media alone, and PMG media alone. Further, combinations of HOX media and conventional adsorption media, such as carbons exhibiting a relatively wide range of pore sizes, can also be employed. The output from the computer model includes selection of the vessel diameter, the media types and their individual quantities (the sub-gradients or layers), and a speciated contaminant breakthrough analysis based on the raw biogas characteristics. Biogas typically contains (by volume percent) 35% to 70% methane, 30% to 65% carbon dioxide, 0% to 40% nitrogen, 0% to 10% Oxygen, 2% to 8% water vapor, trace levels (ppmv range) of alkanes, alkenes, isoalkanes and isoalkenes-type gases, 5 ppm to 2,500 ppm sulfurous contaminants, and from about 25 ppm to as much as 1,500 ppm of Volatile Organic Contaminants (VOCs). It is this VOC contamination, part of which is made up of siloxanes and halogenated chemicals, that is classified for removal by a SAG Process.

The classification of the VOCs and their commensurate concentrations forms the basis of the media segments to construct the siloxane removal gradient. For example, one type of customized SAC type gel media or PMG media is selected to specifically remove high molecular weight VOCs and siloxanes. Another one is selected for removal of the medium molecular weight siloxanes. A third one is selected for removal of low molecular weight siloxanes and other silicon-bearing organics, including those belonging to the alcohol and ether classes (i.e., trimethylsilanol and disilyl ether). Other customized SAC type gel media or PMG media are capable of removing very heavy molecular weight organics. Segmenting, or layering these media in the filter chamber in a certain preferred order with respect to the gas flow direction produces a working gradient over which the removal of the offending species occurs. The media layer depths vary in proportion to the concentration of VOCs and siloxanes in the various classes in the biogas.

The following example is useful to further explain how the SAG profile is developed based on a specific gas stream. Assume that a biogas stream has been analyzed with the following results:

| Contaminant | Concentration, ppbv | Molecular Weight |
| --- | --- | --- |
| Trimethylsilanol | 500 | 90 |
| Pentamethyldisiloxane | 1500 | 148 |
| Octamethyltrisiloxane | 1000 | 237 |

The molecular weights indicate that three different sub-gradients will be required (i.e., none of the molecular weights are substantially similar), and empirical data added to the computer model confirm this assumption. The molecular weight of octamethyltrisiloxane falls within the range of 175 to 250, and the model (based both on the physical characteristics of octamethyltrisiloxane and empirical data) indicate specific HOX media or PMG media that will preferentially remove octamethyltrisiloxane is the grade having an average pore size greater than 2.5 nm and less than 3.5 nm. The molecular weight of pentamethyldisiloxane falls within the range of 125 to 175, and the model (based both on the physical characteristics of pentamethyldisiloxane and empirical data)

indicates the HOX media or PMG media that will preferentially remove pentamethyldisiloxane is the grade having an average pore size of greater than 2.0 nm and less than 3.0 nm. Finally, the molecular weight of trimethylsilanol falls within the range of 75 to 125, and the model (based bothon the physical characteristics of trimethylsilanol and empirical data) indicates the HOX media or PMG media that will preferentially remove trimethylsilanol is the grade of having an average pore size of greater than 1.5 nm and less than 2.0 nm. The gradient defined by the model will include three sub-gradients, and the sub-gradient closest to the gas inlet will be the HOX media or PMG media material selected to preferentially remove octamethyltrisiloxane. The removal efficiencies of HOX media or PMG media for most siloxanes is roughly equivalent; thus, approximately three times as much of the HOX media or PMG media that was selected for pentamethyldisiloxane removal will be required, compared to the amount of the HOX media or PMG media selected for trimethylsilanol removal. Similarly, approximately two times as much of the HOX media or PMG media selected for octamethyltrisiloxane removal will be required, compared to the amount of the HOX media or PMG media selected for trimethylsilanol removal.

The following table provides a correlation between pore sizes and molecular weight. While this table is a useful starting point for initially selecting a grade of filter media, empirical testing on specific contaminant may indicate that a different grade (i.e., a grade of filter media having pores of a different size) is more effective at removing that particular contaminant.

| Contaminant Molecular Weight Range | Relative HOX/PMG Media Pore Size, nm |
| --- | --- |
| <50 | 0.7-1.5 (1.0 for HOX) |
| 50 to 75 | 1.5 to 2.0 |
| 75 to 125 | 2.0 to 2.5 |
| 125 to 175 | 2.0 to 3.0 |
| 175 to 250 | 2.5 to 3.5 |
| >250 | 3.5 to >3.5 |

Basic Sag Systems Using HOX Media or PMG Media

Figure 3:
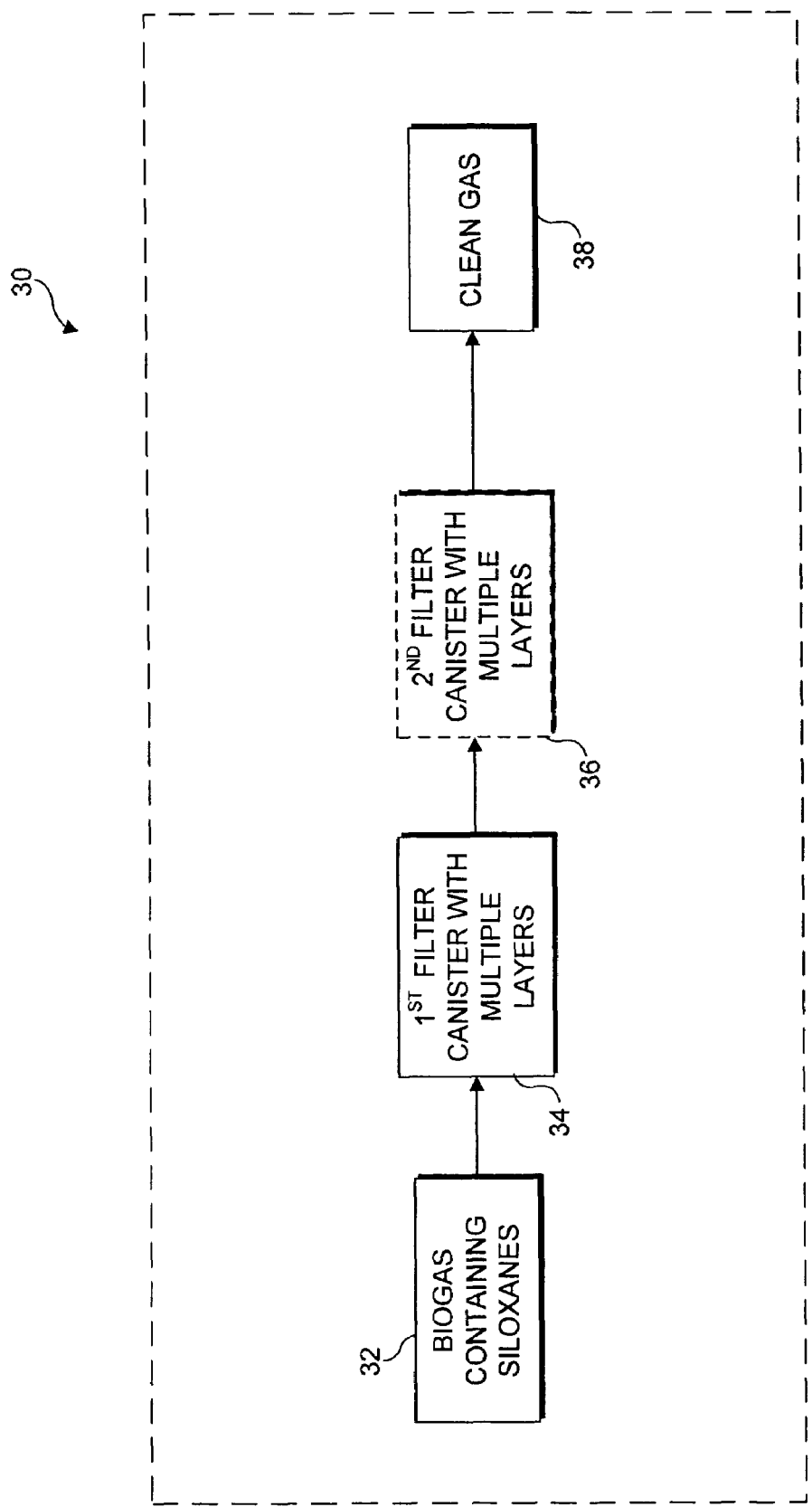

FIG. 3 schematically illustrates the components of a basic SAG system 30 in accord with the present invention. A block 32 represents a biogas (or other gas stream) contaminated with siloxanes being directed into a first filter canister 34, which includes a plurality of sub-gradients or layers of HOX media and/or PMG media. The partially filtered gas is then directed to a second filter canister 36, which also includes a plurality of sub-gradients or layers of HOX media and/or PMG media. Collectively, the sub-gradients in the first and second filter canisters are configured to remove the siloxanes and other contaminants in the gas stream, as identified in the sample analysis described above. Clean gas exits the second canister, as indicated by a block 38. While system 30 is shown with two canisters, it should be understood that more than two canisters can be employed, or only a single canister may be employed (note that the second canister is shown using a dash line, indicating that the second canister is optional). Use of more than one canister will ensure a second canister is available if one canister is taken offline for maintenance. It is particularly useful to keep a replacement for each canister ready, such that if the media in one canister becomes saturated, then a replacement canister can be quickly placed in service. Based on the gas profile determined by the sample analysis, estimated media life for each sub-gradient can be calculated. In systems where the desired removal sequence enables longer lived sub-gradients to be placed in one canister, and more rapidly exhausted sub-gradients to be placed in the other canister, then a replacement canister for only the more rapidly exhausted sub-gradients can be kept at hand. While a single large canister that includes all the sub-gradients required to implement the SAG process can be used, such an implementation would likely require the use of a larger, more expensive canister, and might also preclude employing a spare canister filled with shorter lived sub-gradients.

The term "canister" refers to a generally cylindrical vessel, although it should be understood that the shape of the canister is not critical. The canister should be capable of being sealed, such that the gas to be filtered does not leak out of the canister and so that ambient gases do not migrate into the canister. The canister preferably can be opened such that the sub-gradients in the canister can be removed and replaced as required. Generally, each canister will include more than one sub-gradient.

Figure 4B:
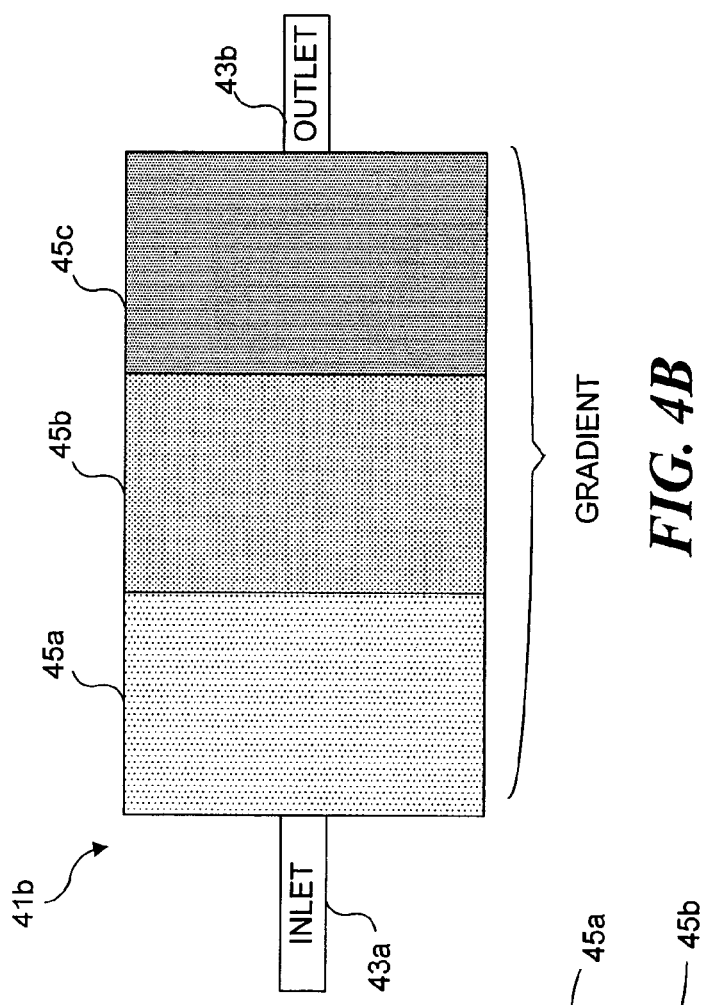
Figure 4A:
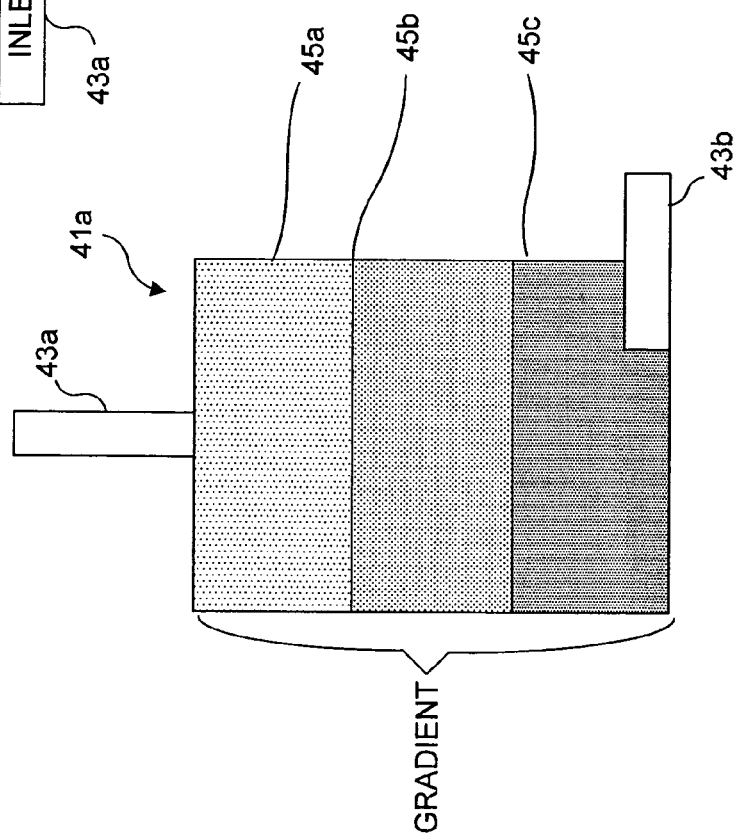

FIG. 4A schematically illustrates a basic filter canister 41a, which includes a gas inlet 43a, a gas outlet 43b, and a plurality of sub-gradient layers 45a, 45b, and 45c. Each sub-gradient layer includes HOX media and/or PMG media having a pore size selected to optimize the removal of a specific class of contaminants known to be present in the gas to be cleaned. The sub-gradient layer closest to the inlet (i.e., sub-gradient layer 45a) is configured to remove the contaminants that are larger molecules, while the sub-gradient layer closest to the outlet (i.e., sub-gradient layer 45c) is configured (by selecting HOX media and/or PMG media having an average pore size that favors the removal of smaller molecules) to remove smaller molecules. The canister in FIG. 4A is configured as a downflow filter. Those of ordinary skill in the art will recognize that filter beds can be configured wherein the gas to be filtered enters the filter at the bottom and moves upwardly through the filter (an upflow filter). Because the sequence of the sub-gradient layers in the filter gradient of the present invention is important, if filter canister 41a is used as an upflow filter, the order of the sub-gradient layer would need to be reversed (i.e., sub-gradient layer 45a would need to be at the bottom nearest the inlet, and sub-gradient layer 45c would need to be at the top, near the outlet). While each sub-gradient layer can be separated by a physical gas permeable membrane (such as a wire mesh or a polymer mesh), such a physical barrier is not required.

In some applications, as few as three (or even two) sub-gradient layers will be all that is required to complete the gradient determined to be required to remove the contaminants identified in the sample analysis. If additional sub-gradient layers are required, then either a larger canister can be employed to accommodate additional layers, or another canister unit can be employed in series with the first canister unit (as shown in FIG. 3). While as shown, sub-gradient layers 45a, 45b, and 45c are each of the same general thickness, it should be understood that the thickness (and volume) of each sub-gradient layer is based on the analysis of the contaminants in the gas stream. Sub-gradient layers engineered (by selecting HOX media and/or PMG media to obtain a layer having an average porosity that favors the removal of a specific class of contaminants) to favor the removal of a certain class of contaminants will be provided in sufficient volume for removal of that class of contaminants. For example, if HOX media and/or PMG media removal efficiency for each class of contaminants is the same, and there is twice as much of contaminant Class A as contaminant Class B, then the sub-gradient layer engineered to remove Class A contaminants will have twice the volume of the sub-gradient layer engineered to remove Class B contaminants. Because the removal efficiency of HOX media and/or PMG media for different classes of contaminants may not always be the same, the relative volume of each sub-gradient layer will be selected to ensure sufficient HOX media and/or PMG media is present to remove the selected class of contaminants.

FIG. 4B schematically illustrates a horizontally oriented filter canister 41b, which similarly includes gas inlet 43a, gas outlet 43b, and the plurality of sub-gradient layers 45a, 45b, and 45c. If canister 41b is configured to be filled with media from the top, then it may be desirable to include membranes to separate each sub-gradient layer to make filling the canister easier.

Figure 4D:
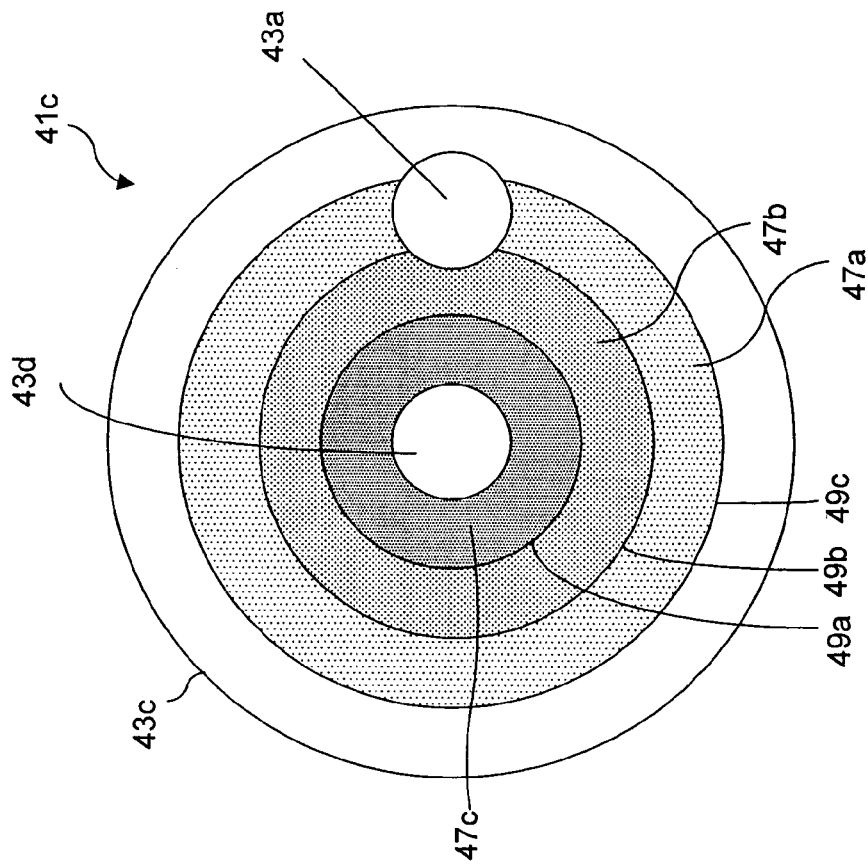
Figure 4C:
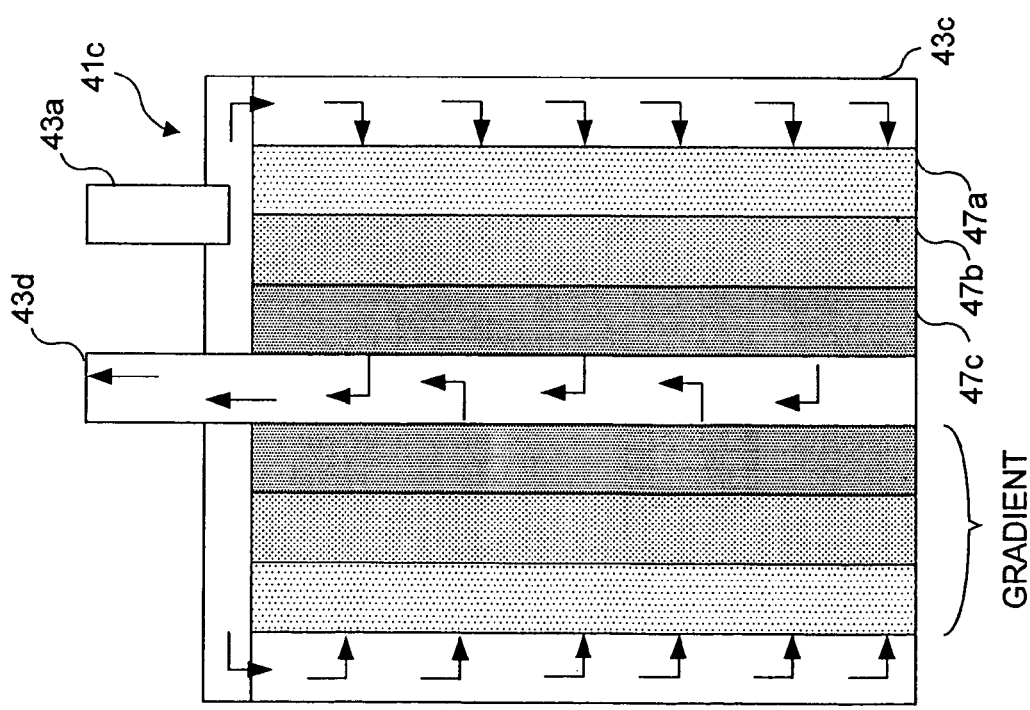

FIGS. 4C and 4D are side and top views, respectively, which schematically illustrate a radially oriented filter canister 41c. Gas inlet 43a is coupled in fluid communication to an outermost annular volume 43c, which defines an inlet plenum. A plurality of inner annular volumes correspond to sub-gradient annular volumes 47a, 47b, and 47c, with sub-gradient volume 47a being disposed closest to inlet plenum 43c. Gas permeable separators 49a, 49b, and 49c, preferably implemented as a wire or polymer mesh (stainless steel mesh is particularly preferred), separate each sub-gradient annular volume. Clean gas exits via a central orifice 43d, serving as an outlet plenum, preferably implemented as a perforated pipe (such as a stainless steel or polymer pipe).

Figures 4E, 4F:
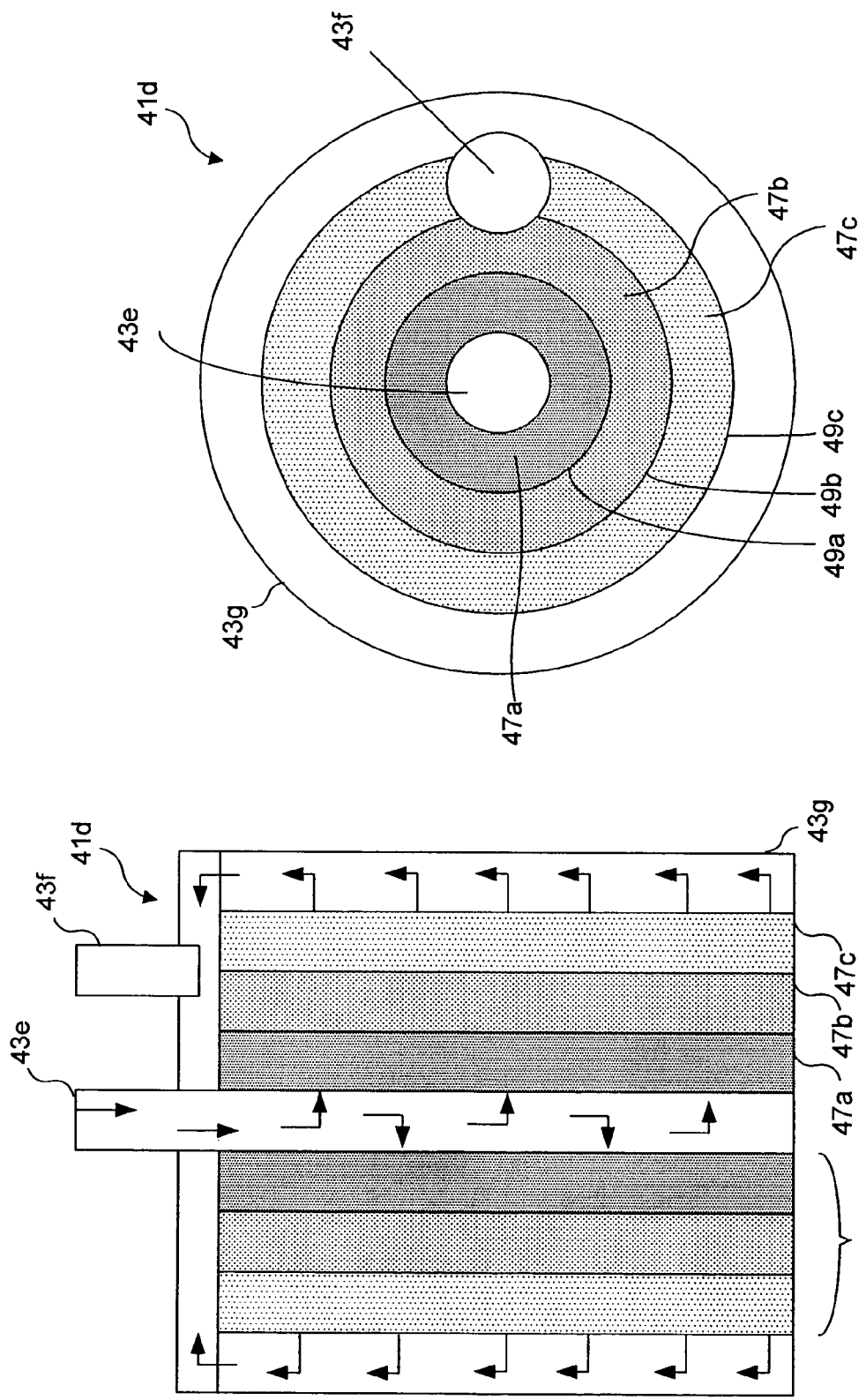

FIGS. 4E and 4F are side and top views, respectively, which schematically illustrate a similar radially oriented filter canister 41d, configured to receive a gas flow via a central orifice 43e (acting as an inlet plenum). Note that the relative position of sub-gradient annular volumes 47a and 47c have been switched in canister 41d as compared to canister 41c, so that sub-gradient annular volume 47a is still closest to the gas inlet. Outermost annular volume 43g acts as an outlet plenum, and is coupled in fluid communication with outlet 43f.

FIG. 5A schematically illustrates the components of an SAG system 40, which includes a regeneration unit for regenerating HOX-media and/or PMG media for reuse. One characteristic of the HOX media and PMG media is that they can be regenerated by heating the media to approximately 600° F. System 40 thus includes filter media transfer equipment 42 and a filter media regeneration unit 44. Preferably, the filter media transfer equipment is a pneumatic system that moves the filter media from the first and second canisters to the filter media regeneration unit. Empirical testing has indicated that hot inert gas can be used as a heat source for regenerating the HOX media. Empirical testing has indicated that helical microwave units can be used as a heat source for regenerating PMG filter media.

A particularly preferred method of generating hot inert gas is combustion of some of the treated fuel gas. This gas is passed counter currently through the HOX media, which drives off the adsorbed VOCs. After the media passes through the inert gas heated column, it is cooled and conveyed back to the canister by an air ejector (pneumatics). Filter canister 34a and filter canister 34b are configured to enable a sub-gradient to be removed from the filter canister, regenerated, and returned.

A particularly preferred microwave heater employs a 2400 MHz magnetron, similar to those found in microwaves for use in homes. Microwave heaters suitable for regenerating a 4 inch column of spent PMG media are available from the CHA Corporation of Laramie, Wyo. The CHA Corporation has developed a procedure to focus the microwaves into a helical configuration for heating a column of spent media. After the media passes through the microwave heated column, it is cooled and conveyed back to the canister by an air ejector (pneumatics). Filter canister 34a and filter canister 34b are configured to enable a sub-gradient to be removed from the filter canister, regenerated, and returned.

FIGS. 5B and 5C provides details of a canister configured to enable HOX media and/or PMG media to be removed and regenerated. In FIG. 5B, wherein filter media are regenerated in a batch process, a canister 46a includes sub-gradient layers 48a, 48b, and 48c. To enable a layer to be removed without disturbing the other layers, each layer is separated by a screen 50, having a mesh smaller than particle size of the HOX media and/or PMG media in each sub-gradient. Screen 50 is preferably a metal screen, as plastics are generally not utilized in gas filtration systems. A pneumatic transfer system 52a can be selectively placed in fluid communication with any of sub-gradients layers 48a, 48b and 48c. Pneumatic transfer system 52a removes some portion of a selected sub-gradient layer and transfers that portion as a batch to microwave heater 54a. That batch of HOX media and/or PMG media is heated to approximated 600° F. (or to some other temperature that has been empirically shown to regenerate the HOX media and/or PMG media) for a period of time that has been empirically determined, to enable regeneration to occur (the regeneration is based on heating the material sufficiently, until the adsorbed contaminants are released from the media). That batch is then transferred back to the appropriate sub gradient layer. FIG. 5C illustrates a substantially similar regeneration system that is based on a continuous cycle, rather than a batch cycle. Canister 46b includes both an inlet and an outlet port for each sub-gradient layer, and more fluid lines are required to couple pneumatic transfer system 52b to canister 46b and microwave heater 54b. The additional fluid lines enable HOX media and/or PMG media to be removed from a sub-gradient layer as a continuous process, as opposed to a batch process. As noted above, microwave heaters 54a or 54b can be replaced with a combustor burning cleaned fuel gas to produce heat to regenerate the media, particularly when HOX media are utilized. Those of ordinary skill in the art will recognize that the combustor can be implemented as an engine configured to perform work (such as the generation of electricity), and waste heat from the engine exhaust used to regenerate the media.

FIG. 5D illustrates a continuously regenerating system based on a moving filter bed. A canister 58 includes a gas inlet disposed near the bottom of the canister, and a gas outlet near the top. Canister 58 includes a cone-shaped bottom from which spent media are removed as required and moved to a regenerator 60. Newly regenerated media are reintroduced into canister 58 at the top of the canister. The organic contaminants removed from the HOX media and/or PMG media by heating the media can be vented to pollution control equipment (not separately shown), ambient atmosphere, or chilled/condensed and collected as liquids for recycle or disposal. In one embodiment, canister 58 includes only a single sub-gradient and a plurality of different canisters are required to achieve the desired gradient. In this embodiment, canister 58 does not need to be taken offline as media are regenerated, since removing some portion of the media does not change the removal characteristics of the canister. In another embodiment, canister 58 includes a plurality of sub-gradients (which are not separated by mesh layer, but are instead stacked upon each other, with no physical interface). In such an embodiment, to maintain the desired removal characteristics, the canister is taken offline until the entire contents of the canister have been removed, regenerated, and returned (in the proper order) to the canister.

FIG. 6 schematically illustrates the components of a SAG system 70, based on system 30 of FIG. 3, but which additionally includes both a pre-treatment unit 72 and a post-treatment unit 74. Depending on the specific characteristics of the gas to be cleaned, several different types of pre-treatment may beneficially improve the SAG processes ability to remove contaminants. Some gas streams may include excess moisture, which can be removed by pre-treatment. Other gas streams may be at a temperature or pressure that is either too low, or too high, for optimal contaminant removal. Pre-treatment units configured to change the temperature or pressure of the incoming gas stream may enhance the removal process. The end use of the cleaned gas may require additional post-treatment processing. For example, the optimal gas pressure or temperature employed in removing the contaminants may not be suitable for downstream uses of the cleaned gas. Suitable post-treatment units configured to modify the temperature, pressure, or composition of the cleaned as can be added as required. Some gas streams may benefit from pre-treatment and not requirement post-treatment, whereas other gas streams may need no pre-treatment but may benefit from post-treatment.

Particularly Preferred Combinations of Adsorption Media

One aspect of the present invention is the use of HOX media (i.e., an inorganic adsorbent media exhibiting a relatively narrow range of pore sizes) alone to remove siloxanes from gas streams. A gas stream including relatively few contaminants might be effectively treated using a single layer of a HOX media. In other embodiments, a plurality of layers of HOX media will be employed to achieve an SAG filter system, generally as described above. It should also be understood that the present invention also encompasses the use of additional layers of other types of adsorption media, in addition to the use of HOX media (i.e., inorganic adsorbent media exhibiting a relatively narrow range of pore sizes).

A particularly effective SAG filter system can be achieved by providing a gradient including layers of HOX media (i.e., inorganic adsorbent media exhibiting a relatively narrow range of pore sizes) and PMG adsorbent media (i.e., carbon-based adsorbent media exhibiting a relatively narrow range of pore sizes).

Combinations of layers of HOX media (i.e., inorganic adsorbent media exhibiting a relatively narrow range of pore sizes) and conventional carbon adsorbent media (i.e. carbon-based adsorbent media exhibiting a relatively wide range of pore sizes) offer an enhancement over the use of any of these adsorbent media individually.

While less effective than the use of HOX media (i.e., inorganic adsorbent media exhibiting a relatively narrow range of pore sizes), functional filtration systems can be implemented using conventional silica gel (i.e., inorganic-adsorbent media exhibiting a relatively wide range of pore sizes) and PMG adsorbent media (i.e., carbon-based adsorbent media exhibiting a relatively narrow range of pore sizes).

Empirical data indicate that the use of inorganic adsorbent media exhibiting a relatively narrow range of pore sizes is 20 to 50% more effective than the use of carbon-based adsorbent media exhibiting a relatively narrow range of pore sizes.

The combination of different adsorbent media in a filtration system has been empirically shown to achieve synergistic effects, enhancing filtration as compared to the use of a single type of adsorbent media. Combining carbon-based adsorbent media with inorganic adsorbent media exhibiting a relatively narrow range of pore sizes has been empirically shown to increase performance 30 to 60%, compared to the use of inorganic adsorbent media exhibiting a relatively narrow range of pore sizes alone.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method of removing siloxanes from a gas stream, comprising the steps of:
   (a) providing a plurality of different grades of mineral-based adsorbent media, wherein each different grade is characterized as having a different average pore size;
   (b) analyzing the gas stream to determine the contaminants present in the gas stream;
   (c) for each different contaminant, selecting the grade of mineral-based adsorbent media whose pore size will enable the preferential removal of that contaminant;
   (d) using the different grades of mineral-based adsorbent media selected to produce a multi-layer filter bed; and
   (e) passing the gas stream through the multi-layer filter bed to remove the contaminants, the different layers minimizing removal competition among the contaminants, thereby enhancing the removal of the siloxanes from the gas stream.

2. The method of claim 1, wherein a plurality of the different grades of the mineral-based adsorbent media are characterized such that at least 50% of the pores in that grade fall within a range that spans less than about 50 nm.

3. The method of claim 1, wherein a plurality of the different grades of the mineral-based adsorbent media are characterized such that at least 50% of the pores in that grade fall within a range that spans less than about 10 nm.

4. The method of claim 1, wherein a plurality of the different grades of the mineral-based adsorbent media are characterized such that at least 50% of the pores in that grade fall within a range that spans less than about 1 nm.

5. The method of claim 1, wherein the different grades of the mineral-based adsorbent media are produced from silica sand.

6. The method of claim 1, wherein the mineral-based adsorbent media comprise at least one of a synthetic silica gel and a synthetic zeolite.

7. The method of claim 1, wherein the mineral-based adsorbent media comprise at least one of an activated silica, an activated silica gel, a silicate acid condensation product, a silicate acid condensation based polymer, and a silicate acid condensation based resin.

8. The method of claim 1, wherein the step of selecting the grade of mineral-based adsorbent media whose pore size will enable the preferential removal of a specific contaminant comprises the step of using a computer model that correlates the pore size of each grade of filter media to a specific contaminant.

9. The method of claim 8, wherein the computer model is based on both theoretical data and empirical data.

10. The method of claim 1, wherein the step of using the different grades of mineral-based adsorbent media selected to produce a multi-layer filter bed comprises the step of configuring the multi-layer filter bed to achieve a segmented activity gradient.

11. The method of claim 1, wherein the step of using the different grades of mineral-based adsorbent media selected to produce a multi-layer filter bed comprises the step of configuring the multi-layer filter bed such that the different grades of mineral-based adsorbent media are arranged in a sequence, so that the gas stream to be filtered will pass through a mineral-based adsorbent media having a largest average pore size first, and the gas stream to be filtered will pass through a mineral-based adsorbent media having a smallest average pore size last.

12. The method of claim 1, wherein the step of using the multi-layer filter bed to remove the contaminants comprises the step of passing the gas stream through the multi-layer filter at a flow rate substantially lower than employed in conventional carbon filter beds.

13. The method of claim 1, further comprising the step of regenerating the mineral-based adsorbent media using a hot inert gas.

14. The method of claim 1, wherein the step of using the different grades of mineral-based adsorbent media selected to produce a multi-layer filter bed further comprises the step of incorporating at least one layer of a carbon-based adsorbent in the multi-layer filter bed.

15. The method of claim 14, wherein the carbon-based adsorbent comprises an adsorbent exhibiting a relatively narrow range of pore sizes.

16. The method of claim 14, wherein the carbon-based adsorbent comprises an adsorbent exhibiting a relatively wide range of pore sizes.

17. The method of claim 1, further comprising the step of color coding the different grades of mineral-based adsorbent media, to facilitate distinguishing one grade from another.

18. A method of removing siloxanes and other contaminants from a gas stream, comprising the steps of:
  (a) providing a plurality of different grades of adsorbent media, wherein each different grade is characterized as exhibiting a relatively narrow range of pore sizes;
  (b) analyzing the gas stream to determine the siloxanes and other contaminants present in the gas stream;
  (c) organizing the contaminants into different classes based on molecular weights of the contaminants;
  (d) for each different class of contaminant, selecting the grade of adsorbent media whose pore size will enable a preferential removal of that class;
  (e) using the different grades of adsorbent media selected to produce a multi-layer filter bed; and
  (f) passing the gas stream through the multi-layer filter bed to remove the siloxanes and the other contaminants, different layers of the multi-layer filter bed minimizing removal competition among the different classes of contaminants, thereby enhancing the removal of the siloxanes from the gas stream.

19. The method of claim 18, wherein the step of using the different grades of adsorbent media selected to produce the multi-layered filter bed comprises the step of using at least one mineral-based adsorbent media.

20. The method of claim 18, wherein the step of using the different grades of adsorbent media selected to produce the multi-layered filter bed comprises the step of using at least one carbon-based adsorbent media.

21. A method of removing siloxanes and other contaminants from a gas stream, comprising the steps of:
  (a) providing a plurality of different grades of mineral-based adsorbent media, wherein each different grade is characterized as exhibiting a relatively narrow range of pore sizes;
  (b) analyzing the gas stream to determine the siloxanes and other contaminants present in the gas stream;
  (c) organizing the contaminants into different classes based on molecular weights of the contaminants;
  (d) selecting the grade of mineral-based adsorbent media whose pore size will enable a preferential removal of the siloxanes;
  (e) using the grade of mineral-based adsorbent media selected to produce a filter bed; and
  (f) passing the gas stream through the filter bed to remove the siloxanes.

22. A multi-layer filter bed for removing contaminants of different molecular weights from a gas stream, comprising:
  (a) a first layer of adsorption media, wherein a majority of pores in the first layer of the adsorption media fall within a range that spans less than about 10 nm and which preferentially remove contaminants having greater molecular weights; and
  (b) a second layer of adsorption media, wherein a majority of pores in the second layer of adsorption media fall within a range that spans less than about 10 nm and which preferentially remove contaminants having smaller molecular weights, the first layer being disposed relatively closer to an inlet than the second layer, the second layer being disposed relatively closer to an outlet than the first layer, and an average pore size of the first layer being generally larger than an average pore size of the second layer, wherein one of the first layer and the second layer comprises carbon-based filter media, and the other of the first layer and the second layer comprises mineral-based filter media.

23. The multi-layer filter bed of claim 22, wherein the second layer of adsorption media comprises the mineral-based adsorption media.

24. The multi-layer filter bed of claim 22, wherein the second layer of adsorption media comprises the carbon-based adsorption media.

25. The multi-layer filter bed of claim 22, further comprising an intermediate layer of adsorption media disposed between the first layer of adsorption media and the second layer of adsorption media, wherein a majority of pores in the intermediate layer of adsorption media fall within a range that spans less than about 10 nm, and which preferentially remove contaminants having intermediate molecular weights.

26. The multi-layer filter bed of claim 22, wherein the mineral-based adsorption media comprises at least one of a synthetic silica gel, a synthetic zeolite, an activated silica, an activated silica gel, a silicate acid condensation product, a silicate acid condensation based polymer, and a silicate acid condensation based resin.

27. A system for removing contaminants of different molecular weights from a gas stream, comprising:
  (a) a multi-layer mineral-based adsorbent media filter bed for removing contaminants of different molecular weights from a gas stream, the multi-layer mineral-based adsorbent media filter bed comprising:
    (i) a first layer of adsorption media, wherein a majority of pores in the first layer of the adsorption media fall within a range that spans less than about 10 nm and which preferentially remove contaminants having greater molecular weights; and
    (ii) a second layer of adsorption media, wherein a majority of pores in the second layer of adsorption media fall within a range that spans less than about 10 nm and which preferentially remove contaminants having smaller molecular weights, the first layer being disposed relatively closer to an inlet than the second layer, the second layer being disposed relatively closer to an outlet than the first layer, and an average pore size of the first layer being generally larger than an average pore size of the second layer, wherein one of the first layer and the second layer comprises a carbon-based filter media, and the other of the first layer and the second layer comprises a mineral-based filter media; and (b) a hot inert gas generator configured to regenerate the multi-layer mineral-based adsorbent media filter bed.

* * * * *